United States Patent
Ulmann et al.

(10) Patent No.: US 11,362,324 B2
(45) Date of Patent: Jun. 14, 2022

(54) COMPOSITIONS AND THEIR USES

(71) Applicant: Imerys Graphite & Carbon Switzerland Ltd., Bodio (CH)

(72) Inventors: Pirmin Ulmann, Glubiasco (CH); Sergio Pacheco Benito, Biasca (CH); Simone Zürcher, Origlio (CH); Marlene Rodlert-Bacilieri, Breganzona (CH); Patrick Lanz, Bellinzona (CH); Michael Spahr, Bellinzona (CH)

(73) Assignee: Imerys Graphite & Carbon Switzerland Ltd., Bodio (CH)

( * ) Notice: Subject to any disclaimer, the term of this patent is extended or adjusted under 35 U.S.C. 154(b) by 309 days.

(21) Appl. No.: 16/332,135

(22) PCT Filed: Sep. 12, 2017

(86) PCT No.: PCT/EP2017/072927
§ 371 (c)(1),
(2) Date: Mar. 11, 2019

(87) PCT Pub. No.: WO2018/046767
PCT Pub. Date: Mar. 15, 2018

(65) Prior Publication Data
US 2019/0237755 A1    Aug. 1, 2019

(30) Foreign Application Priority Data

Sep. 12, 2016    (EP) .................................. 16188385

(51) Int. Cl.
| | | |
|---|---|---|
| *H01M 4/36* | (2006.01) | |
| *H01M 4/133* | (2010.01) | |
| *H01M 4/134* | (2010.01) | |
| *H01M 4/1393* | (2010.01) | |
| *H01M 4/38* | (2006.01) | |
| *H01M 10/052* | (2010.01) | |
| *H01M 4/583* | (2010.01) | |
| *H01M 4/587* | (2010.01) | |
| *H01M 10/0525* | (2010.01) | |
| *H01M 4/02* | (2006.01) | |

(52) U.S. Cl.
CPC ........... *H01M 4/364* (2013.01); *H01M 4/133* (2013.01); *H01M 4/134* (2013.01); *H01M 4/1393* (2013.01); *H01M 4/386* (2013.01); *H01M 4/583* (2013.01); *H01M 4/587* (2013.01); *H01M 10/052* (2013.01); *H01M 10/0525* (2013.01); *H01M 2004/021* (2013.01); *H01M 2004/027* (2013.01); *H01M 2220/20* (2013.01); *Y02T 10/70* (2013.01)

(58) Field of Classification Search
CPC .............................. H01M 4/364; H01M 4/133
See application file for complete search history.

(56) References Cited

U.S. PATENT DOCUMENTS

2010/0285359 A1* 11/2010 Hwang ............. H01M 10/0525
429/219
2013/0252093 A1*  9/2013 Yokomizo ............. H01M 4/366
429/211

FOREIGN PATENT DOCUMENTS

| CN | 103972483 A | 8/2014 |
|---|---|---|
| EP | 2 306 559 A1 | 4/2011 |
| EP | 3 133 690 A1 | 2/2017 |
| JP | 2016-149340 A | 8/2016 |
| KR | 10-2014-0025335 | 3/2014 |
| WO | WO 2013/114094 A1 | 8/2013 |
| WO | WO 2015/158741 A2 | 10/2015 |

OTHER PUBLICATIONS

International Search Report and Written Opinion dated Jan. 9, 2018, in International Application No. PCT/EP2017/072927 (13 pgs.).

* cited by examiner

*Primary Examiner* — Peter F Godenschwager
(74) *Attorney, Agent, or Firm* — Finnegan, Henderson, Farabow, Garrett & Dunner, LLP

(57) ABSTRACT

A precursor composition of a negative electrode of a Li-ion battery, a negative electrode comprising or formed from the precursor composition, a Li-ion battery comprising the negative electrode, a device comprising the negative electrode, methods of making the precursor composition, negative electrode and Li-ion battery, and uses of the precursor composition or components thereof for increasing discharge capacity and/or reducing discharge capacity loss and/or improving cycling stability of a Li-ion battery comprising the negative electrode.

17 Claims, No Drawings

COMPOSITIONS AND THEIR USES

CLAIM FOR PRIORITY

This application is a U.S. national phase entry under 35 U.S.C. § 371 from PCT International Application No. PCT/EP2017/072927, filed Sep. 12, 2017, which claims the benefit of priority of EP Application No. 16188385.5, filed Sep. 12, 2016, to both of which this application claims priority and both of which are incorporated herein by reference.

TECHNICAL FIELD

The present invention is directed to a precursor composition of a negative electrode of a Li-ion battery, to a negative electrode comprising or formed from the precursor composition, to a Li-ion battery comprising the negative electrode, to a device comprising the negative electrode, to a methods of making the precursor composition, negative electrode and Li-ion battery, and to uses of the precursor composition or components thereof for increasing discharge capacity and/or reducing discharge capacity loss and/or improving cycling stability of a Li-ion battery comprising the negative electrode.

BACKGROUND

Metals forming compounds or alloys with lithium exhibit very high specific charge in the negative electrode in lithium ion batteries. For example, the theoretical specific charge of silicon metal electrodes can be up to 4,200 mAh/g. However, specific charge losses during the first charge-discharge cycle and subsequent charge-discharge cycles are significant limitations that have delayed the adoption of metal-based active materials in commercial lithium-ion batteries. These cycling problems are believed to be related to the substantial volume change of metals when forming compounds with lithium during electrochemical insertion.

There is an ongoing need to develop new electrode materials which address these cycling problems.

SUMMARY

A first aspect of the present invention is directed to a precursor composition for a negative electrode of a Li-ion battery comprising a metal-based nano-particulate active material, the precursor composition comprising metal-based nano-particulate active material, and a carbon matrix having a bulk BET SSA of lower than about 10 m$^2$/g, wherein the carbon matrix comprises at least first and second carbonaceous particulate materials, wherein the BET SSA of the first carbonaceous particulate material is lower than the BET SSA of the second carbonaceous particulate material and of the carbon matrix, wherein the BET SSA of the second carbonaceous particulate is higher than the BET SSA of the first carbonaceous particulate and of the carbon matrix.

A second aspect of the present invention is directed to a precursor composition for a negative electrode of a Li-ion battery comprising a metal-based nano-particulate active material, the precursor composition comprising a carbon matrix having a bulk BET SSA of lower than about 10 m$^2$/g, wherein the carbon matrix comprises at least first, second and third carbonaceous particulate materials, wherein the BET SSA of the first carbonaceous particulate material is lower than the BET SSA of the second carbonaceous particulate material and of the carbon matrix, wherein the BET SSA of the second carbonaceous particulate material is higher than the BET SSA of the first carbonaceous particulate material and of the carbon matrix, and wherein the BET SSA of the third carbonaceous particulate material is higher than the BET SSA of the second carbonaceous particulate material.

In certain embodiments, of the first and second aspects:
(i) each of the first and second carbonaceous particulate materials are graphitic; and/or
(ii) each of the first and second carbonaceous particulate materials has a xylene density of at least about 2.1 g/cm$^3$; and/or
(iii) at least the first carbonaceous particulate material, and optionally both of the first and second carbonaceous particulate materials, has a d$_{50}$ of less than 20 µm.

A third aspect of the present invention is directed to a negative electrode for a Li-ion battery comprising a metal-based nano-particulate active material, manufactured from a precursor composition according to first or second aspect.

A fourth aspect of the present invention is directed to a negative electrode comprising a metal-based nano-particulate active material, for example, at least 1 wt. % of said active material based on the total weight of the electrode, and a carbon matrix having a bulk BET SSA of lower than about 10 m$^2$/g, wherein the carbon matrix comprises at least first, second and optional third carbonaceous particulate materials, wherein the BET SSA of the first carbonaceous particulate material is lower than the BET SSA of the second carbonaceous particulate material and of the carbon matrix, wherein the BET SSA of the second carbonaceous particulate material is higher than the BET SSA of the first carbonaceous particulate and of the carbon matrix, and wherein the BET SSA of the optional third carbonaceous particulate material is higher than the BET SSA of the second carbonaceous particulate material.

A fifth aspect of the present invention is directed to a Li-ion battery comprising a negative electrode according to third or fourth aspect.

A sixth aspect of the present invention is directed to a Li-ion battery comprising a negative electrode, the Li-ion battery negative electrode having one or more of
a discharge capacity at cycle 15 of at least about 400 mAh/g, or at least about 500 mAh/g, and/or
a discharge capacity loss between cycles 5 and 15 of equal to or less than about 25%, based on the full mass of the negative electrode,
wherein the negative electrode comprises a metal-based nano-particulate active material and a carbonaceous particulate, optionally wherein the metal-based nano-particulate active material is elemental silicon.

A seventh aspect of the present invention is directed to a device comprising a Li-ion battery according to the fifth or sixth aspect.

An eighth aspect of the present invention is directed to the use, as an additive in a negative electrode comprising a metal-based nano-particulate active material, of a mixture of a carbonaceous particulate material having a BET SSA of greater than about 20 m$^2$/g and a carbonaceous particulate having a BET SSA of equal to or lower than about 20 m$^2$/g, the mixture having a spring-back of less than about 20%.

A ninth aspect of the present invention is directed to the use of the second carbonaceous particulate material and/or the third carbonaceous particulate material as defined in the first or second aspect in a negative electrode for a Li-ion battery comprising a metal-based nano-particulate active material, for increasing discharge capacity and/or reducing discharge capacity loss and/or improving cycling stability of the Li-ion battery comprising the negative electrode, wherein the negative electrode comprises at least about 1 wt. % of the metal-based nano-particulate active material, based on the total weight of the negative electrode, for example, compared to a Li-ion battery with a second negative electrode comprising the metal-based nano-particulate active material which does not comprise the additive.

A tenth aspect of the present invention is directed to the use of a carbonaceous particulate material having a BET SSA of greater than about 20 m$^2$/g in a negative electrode for a Li-ion battery comprising a metal-based nano-particulate active material, optionally wherein the carbonaceous particulate material has a spring-back of equal to or less than about 20%.

An eleventh aspect of the present invention is directed to a device comprising an electrode according to the third or fourth aspect or a Li-ion battery according to the fifth or sixth aspect.

A twelfth aspect of the present invention is directed to an energy storage cell comprising a composition according to the first or second aspect.

DETAILED DESCRIPTION OF THE INVENTION

The present inventors surprisingly found that by combining a metal-based nano-particulate active material with a carbon matrix comprising carbonaceous particulates, cycling stability can be improved and/or irreversible capacity losses reduced. Without wishing to be bound by theory, it is believed that the carbon matrix, optionally comprising at least two different types of carbonaceous particulate material, provides flexibility to the negative electrode structure. This flexibility compensates the volume changes of the metal nano-particulates during lithium insertion and serves to stabilize the metal-based active material during cycling, and provide a balance of properties in the negative electrode in terms of surface characteristics, specific surface area, mechanical properties (including flexibility), morphology, particle size distribution, electrical and ionic conductivity, and adhesion (interaction with binders).

As such, and in accordance with the first aspect, there is provided a precursor composition for a negative electrode of a Li-ion battery comprising a metal-based nano-particulate active material, the precursor composition comprising a metal-based nano-particulate active material, and a carbon matrix having a bulk BET specific surface area (SSA) of lower than about 10 m$^2$/g, wherein the carbon matrix comprises at least first and second carbonaceous particulate materials, wherein the BET SSA of the first carbonaceous particulate material is lower than the BET SSA of the second carbonaceous particulate material and of the carbon matrix, wherein the BET SSA of the second carbonaceous particulate is higher than the BET SSA of the first carbonaceous particulate and of the carbon matrix.

The "bulk" BET SSA of the carbon matrix as referred to herein relates to the "overall" BET SSA of the carbon matrix formed by at least a first and a second, and optionally further, carbonaceous particulate materials. In other words, the "bulk BET SSA" used in connection with the carbon matrix is the BET SSA of the mixture of carbon particles yielding the carbon matrix, wherein the components of the mixture may each have their own BET SSA when characterized on their own.

In certain embodiments, the composition comprises at least about 1 wt. % of the metal-based nano-particulate active material, based on the total weight of the negative electrode.

Also, in accordance with the second aspect, there is provided a precursor composition for a negative electrode of a Li-ion battery comprising a metal-based nano-particulate active material, the precursor composition comprising a carbon matrix having a BET SSA of lower than about 10 m$^2$/g, wherein the carbon matrix comprises at least first, second and third carbonaceous particulate materials, wherein the BET SSA of the first carbonaceous particulate material is lower than the BET SSA of the second carbonaceous particulate material and of the carbon matrix, wherein the BET SSA of the second carbonaceous particulate material is higher than the BET SSA of the first carbonaceous particulate and of the carbon matrix, and wherein the BET SSA of the third carbonaceous particulate material is higher than the BET SSA of the second carbonaceous particulate material.

By "carbonaceous particulate material" is meant a carbon-containing material which is suitable for use in the negative electrode of a Li-ion battery. In certain embodiments, the carbonaceous particulate material is selected from natural graphite, synthetic graphite, coke, exfoliated graphite, graphene, few-layer graphene, graphite fibers, nano-graphite, non-graphitic carbon, carbon black, petroleum- or coal based coke, glass carbon, carbon nanotubes, fullerenes, carbon fibers, hard carbon, graphitized fined coke, or mixtures thereof. Specific carbonaceous particulate materials include, but are not limited to exfoliated graphites as described in WO 2010/089326 (highly oriented grain aggregate graphite, or HOGA graphite), or as described in co-pending EP application no. 16 188 344.2 (wet-milled and dried carbonaceous sheared nano-leaves) filed on Sep. 12, 2016.

In certain embodiments, the carbonaceous particulate materials are selected from graphite and/or carbon black. In certain embodiments, the carbon black, when present, for example, as one of the second, third, fourth and/or fifth carbonaceous particulate material, has a BET SSA of less than about 1200 m$^2$/g, for example, less than about 1000 m$^2$/g, or less than about 800 m$^2$/g, or less than about 600 m$^2$/g, or less than about 400 m$^2$/g, or less than about 200 m$^2$/g. In certain embodiments, the carbon black has a BET SSA of less than about 100 m$^2$/g, for example, from about 30 m$^2$/g to about 80 m$^2$/g, or from about 30 m$^2$/g to about 60 m$^2$/g, or from about 35 m$^2$/g to about 55 m$^2$/g, or from about 40 m$^2$/g to about 50 m$^2$/g.

The terms "first", "second", "third", "fourth", etc., used to describe carbonaceous particulates are used to differentiate between different types of carbonaceous particulates which are present in the precursor compositions. The first carbonaceous particulate has a BET SSA which is lower than the BET SSA of the carbon matrix. The first carbonaceous particulate may itself comprise a mixture of different carbonaceous particulates, for example, a mixture of two different carbonaceous particulates, provided the first carbonaceous particulate overall has a BET SSA which is lower than the BET SSA of the carbon matrix and provided that each different carbonaceous particulate individually has a BET SSA which is lower than the BET SSA of the carbon matrix. The second, third, fourth, etc., carbonaceous particulates, when present, will each individually have a BET SSA which is higher than the BET SSA of the first carbonaceous particulate and, in certain embodiments, also higher than the carbon matrix. Thus, by way of example, in embodiments in which the carbon matrix consists of only the first carbonaceous particulate and a further carbonaceous particulate having a BET SSA which is higher than the first carbonaceous particulate, the further carbonaceous particulate will be referred to as the second carbonaceous particulate. Inclusion of a yet a further carbonaceous particulate would be referred to as the third carbonaceous particulate, and so on. In another embodiment in which the carbon matrix consists of only the first carbonaceous particulate and what is referred to in the previous embodiment as the third carbonaceous particulate, the formerly third carbonaceous particulate would be present as the second carbonaceous particulate. This illustrates therefore that, unless otherwise stated, other than the first carbonaceous particulate, the further carbonaceous particulates may be interchangeably referred to as a second, third, fourth, and so on, depending on how many different carbonaceous particulates are present in the carbon matrix and precursor composition. In other words, as noted above, these terms are used merely to differentiate between different types of carbonaceous particulates which are present in the precursor compositions. In certain embodiments in which the first carbonaceous particulate comprises a mixture of different carbonaceous particulates, these may be referred to as first carbonaceous particulate (a), first carbonaceous particulate (b), and so on.

The metal-based nano-particulate active material may be part of the precursor composition, in accordance with the first aspect, or may or may not be part of the precursor composition, in accordance with the second aspect. When the active material is not part of the precursor composition, it may be combined with the precursor composition along with any other components (e.g., binder) for forming into a negative electrode. In certain embodiments of the first aspect, additional active material may be added to the precursor composition prior to forming into a negative electrode. In certain embodiments of either aspect, additional carbonaceous particulate(s) may be added to the precursor composition for forming into a negative electrode, provided that the negative electrode comprises at least 1 wt. % active material, based on the total weight of the negative electrode.

The active material is a non-carbonaceous, metal-based nano-particulate. By "metal-based" is meant a non-carbonaceous species which comprises metal which is in elemental form, part of an alloy, or in compound form, such as a metal oxide. By "nano-particulate" is meant a material comprising average particle sizes with at least one dimension of less than about 500 nm. In certain embodiments, the metal-based nano-particulate has an average particle size with at least one dimension of less than about 350 nm, for example, from about 10 nm to about 250 nm, or from about 20 nm to about 200 nm, or from about 20 nm to about 150 nm, or from about 20 nm to about 100 nm, or from about 20 nm to about 80 nm, or from about 20 nm to about 60 nm, or from about 30 nm to about 50 nm. In certain embodiments, the metal-based nano-particulate is material comprising or composed of average particle sizes in which all dimensions are less than about 500 nm, for example, less than about 350 nm, or from about 10 nm to about 250 nm, or from about 20 nm to about 200 nm, or from about 20 nm to about 150 nm, or from about 20 nm to about 100 nm, or from about 20 nm to about 80 nm, or from about 20 nm to about 60 nm, or from about 30 nm to about 50 nm. Particle sizes may be determined in accordance with any suitable method. For example, particle size of the metal-based nano-particulate may be determined by transmission electron microscopy (TEM) or scanning electron microscopy (SEM), or a combination of TEM and SEM.

The metal may be any which is suitable for use as active material in a negative electrode of a Li-ion battery (i.e., any metal and/or metal allow or metal containing compound, e.g., metal oxide, which is capable of inserting lithium electrochemically). The metal may be a Group 13, 14 or Group 15 element, or mixtures thereof, but is not limited to only these metals. The metal may be silicon, e.g., elemental Si, a Si-containing ally or Si oxide, and/or tin, e.g., elemental Sn, a Sn-containing alloy, or Sn oxide. In certain embodiments, the metal-based nano-particulate active material is elemental silicon, (i.e., silicon metal), silicon oxide or an alloy containing silicon, or any combination thereof. In certain embodiments, the silicon is elemental silicon. In certain embodiments, the silicon is elemental silicon having a purity of at least about 95%, for example, at least about 96%, or at least about 97%, or at least 98 about %, or at least about 99%, or at least about 99.9%, or at least about 99.99%. In certain embodiments, the silicon is at least about 98% pure. Consistent with the meaning of "nano-particulate" above, in certain embodiments, the elemental silicon has an average particle size of from about 10 nm to about 200 nm, for example, from about 20 nm to about 150 nm, or from about 20 nm to about 100 nm, or from about 20 nm to about 80 nm, or from about 20 nm to about 60 nm, or from about 30 nm to about 50 nm. In certain embodiments, the metal-based nano-particulate active material is elemental silicon having a purity of at least about 95%, for example, at least about 98%, and having an average particle size of from about 30 nm to about 50 nm.

Hereinafter, certain embodiments of the invention may tend to be discussed in terms of a silicon active material, and in relation to certain embodiments where the silicon active material is incorporated in a precursor composition, negative electrode and/or Li-ion battery. The invention should not be construed as being limited to such embodiments, and in particular, encompasses embodiments in which the metal-based nano-particulate active material is one or other of the metal-based nano-particulate active materials described in the preceding paragraphs. Also, the various aspects and embodiments described herein may be implemented with a mixture of metal-based nano-particulate active materials, e.g., embodiments in which the metal is different and/or the form of the active material is different, but the metal is the same, e.g., a mixture of Si and Sn (i.e., different metal), or a mixture of Sn and $SnO_2$ (i.e., same metal but different form thereof), etc.

In certain embodiments, the metal-based nano-particulate is a silicon particulate or a silicon-carbon particulate composite.

Silicon Particulate

The silicon particulate of the present disclosure has one or more of:
  (i) a microporosity of at least about 10%,
  (ii) a BJH average pore width of from about 110 Å to about 200 Å, and
  (iii) a BJH volume of pores of at least about 0.32 $cm^3/g$.

By "microporosity" is meant the % of external surface area of micropores in relation to the total BET specific surface area of the particulate. As used herein, a "micropore" means a pore width of less than 20 Å, a "mesopore" means a pore width of from 20 Å to 500 Å, and a "macropore" means a pore width of greater than 500 Å, in accordance with the IUPAC classification.

In certain embodiments, the silicon particulate has one or more of:
  (i) a microporosity of from about 15% to about 50%,
  (ii) a BJH average pore width of from about 130 Å to about 180 Å, and
  (iii) a BJH volume of pores of at least about 0.35 $cm^3/g$.

In certain embodiments, the silicon particulate has one or more of:
(i) a microporosity of from about 15% to about 25%, for example, from about 18-22%
(ii) a BJH average pore width of from about 150 Å to about 180 Å, for example, from about 160 Å to about 170 Å, and
(iii) a BJH volume of pores of at least about 0.45 cm$^3$/g, for example, from about 0.50 cm$^3$/g to about 0.60 cm$^3$/g.

In certain embodiments, the silicon particulate has one or more of:
(i) a microporosity of from about 25% to about 35%, for example, from about 28-32%
(ii) a BJH average pore width of from about 130 Å to about 160 Å, for example, from about 140 Å to about 150 Å, and
(iii) a BJH volume of pores of at least about 0.35 cm$^3$/g, for example, from about 0.35 cm$^3$/g to about 0.45 cm$^3$/g.

In certain embodiments, the silicon particulate has at least two of (i), (ii) and (iii), for example, (i) and (ii), or (ii) and (iii), or (i) and (iii). In certain embodiments, the silicon particulate has each of (i), (ii) and (iii).

In certain embodiments, the silicon particulates may be further characterized in having:
(a) a percentage of the total pore volume which resides in pores having a pore width of from 400 to 800 Å which is greater than the percentage of the total pore volume which resides in pores having a pore width of greater than 800 Å to 1200 Å; and/or
(b) a maximum pore volume contribution at a pore width of between about 300 and about 500 A, or between about 300 and about 400 Å, or between about 400 and about 500 Å.

The maximum pore volume corresponds to the peak value when plotting the derivatives dV/d log(w) (V=pore volume and w=pore width) against the pore size distribution. In other words, the "maximum pore volume" indicates at which pore width the pore volume contribution is highest.

Additionally or alternatively, in certain embodiments, in addition to (i), (ii) and/or (iii) above, the silicon particulate may have:
(1) a BET specific surface area (SSA) of at least about 70 m$^2$/g; and/or
(2) an average particle size of less than about 750 Å.

In certain embodiments, the silicon particulate has a BET SSA of from about 100 m$^2$/g to about 300 m$^2$/g, for example, from about 100 m$^2$/g to about 200 m$^2$/g, or from about 120 m$^2$/g to about 180 m$^2$/g, or from about 140 m$^2$/g to about 180 m$^2$/g, or from about 150 m$^2$/g to about 170 m$^2$/g, or from about 155 m$^2$/g to about 165 m$^2$/g.

In certain embodiments, the silicon particulate has an average particle size of from about 100 Å to about 600 Å, for example, from about 100 Å to about 500 Å, or from about 100 Å to about 400 Å, or from about 100 Å to about 300 Å, or from about 100 Å to about 250 Å, or from about 100 Å to about 200 Å, or from about 110 Å to about 190 Å, or from about 120 Å to about 180 Å, or from about 130 Å to about 180 Å, or from about 140 Å to about 180 Å, or from about 150 Å to about 170 Å, or from about 155 Å to about 165 Å.

In certain embodiments, the silicon particulate has an average particle size of from about 100 Å to about 200 Å. In certain embodiments, the silicon particulate has an average particle size of from about 140 Å to about 180 Å. In certain embodiments, the silicon particulate has an average particle size of from about 150 Å to about 170 Å.

In certain embodiments, the silicon particulate has a nanostructure which inhibits or prevents silicon pulverization when used as active material in a negative electrode of a Li-ion battery.

By "inhibiting or preventing silicon pulverization" is meant that Li is de-intercalated in a single amorphous phase in a continuous process, more particularly, that the nanostructure promotes the formation of amorphous Li$_x$Si with the gradual change of X in one continuous phase, and in the substantial absence of the formation of two phases containing crystalline Si and crystalline Li$_{15}$S$_4$. The formation of crystalline Li$_{15}$S$_4$ is detectable in a 1$^{st}$ cycle Li intercalation and de-intercalation curve by the presence of a characteristic plateau in the de-intercalation curve part way between full charge and full discharge. The plateau is characterized in that the Potential vs. Li/Li+[V] (which is the Y-axis of the 1$^{st}$ cycle Li intercalation and de-intercalation curve) changes by no more than about 0.05 V across a Specific Charge/372 mAh/g (which is the X-axis of the 1$^{st}$ cycle Li interaction and de-intercalation curve) of 0.2. Without wishing to be bound by theory, it is believed that the silicon particulate reduces the extent of volume expansion during lithium intercalation, by preventing or at least inhibiting the formation of Si—Li crystalline alloy phases, and promotes the formation of an amorphous Li$_x$Si phase. The result is improvement in cycle stability and reduction in specific charge loss.

Additionally or alternatively, therefore, in certain embodiments, the silicon particulate has a nanostructure which maintains electrochemical capacity of a negative electrode, of a Li-ion battery when used as active material. By "maintains electrochemical capacity", means that the specific charge of the negative electrode after 100 cycles is at least 85% of the specific charge after 10 cycles, for example, at least 90% of the specific charge after 10 cycles. In other words, the negative electrode comprising the silicon particulate may have at least 85% capacity retention after 100 cycles, for example, at least 90% capacity retention after 100 cycles.

In certain embodiments, the silicon particulate is wet-milled, for example, wet-milled in accordance with the methods described herein.

Method of Making Silicon Particulate

The silicon particulate may be manufactured by wet-milling a silicon particulate starting material under conditions to produce a silicon particulate according to the first aspect and/or having a nanostructure which inhibits or prevents silicon pulverization and/or maintains electrochemical capacity when use as active material in a negative electrode of a Li-ion battery. By "wet-milling" is meant milling in the presence of liquid, which may be organic, aqueous, or a combination thereof.

In certain embodiments, the silicon particulate starting material comprises silicon microparticles having particle sizes of from about 1 μm to about 100 μm, for example, from about 1 μm to about 75 μm, or from about 1 μm to about 50 μm, or from about 1 μm to about 25 μm, or from about 1 μm to about 10 μm. In certain embodiments, the silicon particulate starting material is a micronized silicon particulate having a particle size of from about 1 μm to about 10 μm.

In certain embodiments, the method comprises one or more of the following:

(i) wet-milling in the presence of solvent, for example, an aqueous alcohol-containing mixture, (ii) wet-milling in a rotor-stator mill, a colloidal mill or a media mill, (iii) wet-milling under conditions of high shear and/or high power density, (iv) wet-milling in the presence of relatively hard and dense milling media, and (v) drying In certain embodiments, the method comprise two or more of (i), (ii), (iii) and (iv) followed by drying, for example, three or more of (i), (ii), (iii) and (iv) followed by drying, or all of (i), (ii), (iii) and (iv) followed by drying.

(i) Wet Milling in the Presence of an Aqueous Alcohol-Containing Mixture

The solvent may be organic or aqueous, or may be a combination of an organic solvent with water. In certain embodiments, the solvent is organic, for example, consists of an organic solvent or a mixture of different organic solvents. In certain embodiments, the solvent is aqueous, for example, consists of water. In certain embodiments, the solvent is a mixture of organic solvent and water, for example, in a weight ratio of from about 99:1 to about 1:99. In such embodiments, the organic solvent may comprise a mixture of different organic solvents. Inn such embodiments, the solvent may be predominantly organic, for example, at least about 90% organic, or at least 95% organic, or at least 99% organic, or at least 99.5% organic, or at least 99.9%. In certain embodiments, solvent is predominantly organic and comprises water in trace amounts, for example, from about 0.01 wt. % to about 1.0 wt. %, for example, from about 0.01 wt. % to about 0.5 wt. %, or from about 0.01 wt. % to about 0.1 wt. %, or from about 0.01 wt. % to about 0.05 wt. %, based on the total weight of the solvent.

In certain embodiments, the solvent is an aqueous alcohol-containing mixture may comprise water and alcohol in a weight ratio of from about 10:1 to about 1:1, for example, from about 8:1 to about 2:1, or from about 6:1 to about 3:1, or from about 5:1 to about 4:1. The total amount of liquid may be such to produce a slurry of the silicon particulate starting material having a solids content of no greater than about 20 wt. %, for example, no greater than about 15 wt. %, or at least about 5 wt. %, or at least about 10 wt. %. In these embodiments, the alcohol could be replaced with an organic solvent other than an alcohol, or a mixture of organic solvents comprising alcohol and another organic solvents), or a mixture of organic solvents other than alcohol, with the weight ratios given above pertaining to the total amount of organic solvent.

The alcohol may be a low molecular weight alcohol having up to about 4 carbon atoms, for example, methanol, ethanol, propanol or butanol. In certain embodiments, the alcohol is propanol, for example, isopropanol.

(ii) and (iii)

In certain embodiments, the wet-milling is conducted in a rotor stator mill, a colloidal mill or a media mill. These mills are similar in that they can be used to generate high shear conditions and/or high power densities.

A rotor-stator mill comprises a rotating shaft (rotor) and an axially fixed concentric stator.

Toothed varieties have one or more rows of intermeshing teeth on both the rotor and the stator with a small gap between the rotor and stator, which may be varied. The differential speed between the rotor and the stator imparts extremely high shear. Particle size is reduced by both the high shear in the annular region and by particle-particle collisions and/or particle-media collisions, if media is present.

A colloidal mill is another form of rotor-stator mill. It is composed of a conical rotor rotating in a conical stator. The surface of the rotor and stator can be smooth, rough or slotted. The spacing between the rotor and stator is adjustable by varying the axial location of the rotor to the stator. Varying the gap varies not only the shear imparted to the particles but also the mill residence time and the power density applied. Particle size reduction may be affected by adjusting the gap and the rotation rate, optionally in the presence of media.

Media mills are different in operation than a rotor-stator mill but likewise can be used to generate high shear conditions and power densities. The media mill may be a pearl mill or bead mill or sand mill. The mill is comprises a milling chamber and milling shaft. The milling shaft typically extends the length of the chamber. The shaft may have either radial protrusions or pins extending into the milling chamber, a series of disks located along the length of the chamber, or a relatively thin annular gap between the shaft mill chamber. The typically spherical chamber is filled with the milling media. Media is retained in the mill by a mesh screen located at the exit of the mill. The rotation of the shaft causes the protrusions to move milling media, creating conditions of high shear and power density. The high energy and shear that result from the movement of the milling media is imparted to the particles as the material is circulated through the milling chamber.

The rotation speed within the mill may be at least about 5 m/s, for example, at least about 7 m/s or at least about 10 m/s. The maximum rotation speed may vary from mill to mill, but typically is no greater than about 20 m/s, for example, no greater than about 15 m/s. Alternatively, the speed may be characterized in terms of rpm. In certain embodiments, the rpm of the rotor-stator or milling shaft in the case of a media mill may be at least about 5000 rpm, for example, at least about 7500 rpm, or at least about 10,000 rpm, or at least about 11,000 rpm. Again, maximum rpm may be vary from mill to mill, but typically is no greater than about 15,000 rpm.

In certain embodiments, the rpm of the rotor-stator or milling shaft in the case of a media mill may be at least about 500 rpm, for example, at least about 750 rpm, or at least about 1000 rpm, or at least about 1500 rpm. Again, maximum rpm may be vary from mill to mill, but typically is no greater than about 3000 rpm.

Power density may be at least about 2 kW/l (l=liter of slurry), for example, at least about 2.5 kW/l, or at least about 3 kW/l. In certain embodiments, the power density is no greater than about 5 kW/l, for example, no greater than about 4 kW/l.

Residence in time within the mill is less than 24 hours, for example, equal to or less than about 18 hours, or equal to or less than about 12 hours, or equal to or less than about 6 hours, or equal to or less than about 4 hours, or equal to or less than about 220 minutes, or equal to or less than about 200 minutes, or equal to or less than about 180 minutes, or equal to or less than about 160 minutes, or equal to or less than about 140 minutes, or equal to or less than about 120 minutes, or equal to or less than about 100 minutes, or equal to or less than about 80 minutes, or equal to or less than about 60 minutes, or equal to or less than about 40 minutes, or equal to or less than about 20 minutes.

(iv) Wet-Milling in the Presence of Relatively Hard and Dense Milling Media

In certain embodiments, the milling media is characterized by having a density of at least about 3 g/cm$^3$, for example, at least about 3.5 g/cm$^3$, or at least about 4.0 g/cm$^3$, or at least about 4.5 g/cm$^3$, or at least about 5.0 g/cm$^3$, or at least about 5.5 g/cm$^3$, or at least about 6.0 g/cm$^3$. In certain embodiments, the milling media is a ceramic milling media, for example, yttria-stabilized zirconia, ceria-stabilized zirconia, fused zirconia, alumina, alumina-silica, alumina-zirconia, alumina-silica-zironia, and ytrria or ceria stabilized forms thereof. The milling media, for example, ceramic milling media, may be in the form of beads. The milling media, for example, ceramic milling media may have a size of less than about 10 mm, for example, equal to or less than about 8 mm, or equal to or less than about 6 mm, or equal to or less than about 4 mm, or equal to or less than about 2 mm, or equal to or less than about 1 mm, or equal to or less than about 0.8 mm, or equal or less than about 0.6 mm, or equal to or less than about 0.5 mm. In certain embodiments, the milling media has a size of at least 0.05 mm, for example, at least about 0.1 mm, or at least about 0.2 mm, or at least about 0.3 mm, or at least about 0.4 mm.

In certain embodiments, wet milling is conducted in a planetary ball mill with milling media, for example, ceramic milling media, having a size of up to about 10 mm.

(v) Drying

Drying may be effected by any suitable technique using any suitable drying equipment. Typically, the first step of the drying (or, alternatively, the last action of the milling step) is recovering the solid material from the dispersion, for example by filtration or centrifugation, which removes the bulk of the liquid before the actual drying takes place. In some embodiments, the drying step c) is carried out by a drying technique selected from subjecting to hot air/gas in an oven or furnace, spray drying, flash or fluid bed drying, fluidized bed drying and vacuum drying.

For example, the dispersion may be directly, or optionally after filtering the dispersion through a suitable filter (e.g. a <100 μm metallic or quartz filter), introduced into an air oven at typically 120 to 230° C., and maintained under these conditions, or the drying may be carried out at 350° C., e.g., for 3 hours. In cases where a surfactant is present, the material may optionally be dried at higher temperatures to remove/destroy the surfactant, for example at 575° C. in a muffle furnace for 3 hours.

Alternatively, drying may also be accomplished by vacuum drying, where the processed dispersion is directly, or optionally after filtering the dispersion through a suitable filter (e.g. a <100 μm metallic or quartz filter), introduced, continuously or batch-wise, into a closed vacuum drying oven. In the vacuum drying oven, the solvent is evaporated by creating a high vacuum at temperatures of typically below 100° C., optionally using different agitators to move the particulate material. The dried powder is collected directly from the drying chamber after breaking the vacuum.

Drying may for example also be achieved with a spray dryer, where the processed dispersion is introduced, continuously or batch wise, into a spray dryer that rapidly pulverizes the dispersion using a small nozzle into small droplets using a hot gas stream. The dried powder is typically collected in a cyclone or a filter. Exemplary inlet gas temperatures range from 150 to 350° C., while the outlet temperature is typically in the range of 60 to 120° C.

Drying can also be accomplished by flash or fluid bed drying, where the processed expanded graphite dispersion is introduced, continuously or batch wise, into a flash dryer that rapidly disperses the wet material, using different rotors, into small particles which are subsequently dried by using a hot gas stream. The dried powder is typically collected in a cyclone or a filter. Exemplary inlet gas temperatures range from 150 to 300° C. while the outlet temperature is typically in the range of 100 to 150° C.

Alternatively, the processed dispersion may be introduced, continuously or batch-wise, into a fluidized bed reactor/dryer that rapidly atomizes the dispersion by combining the injection of hot air and the movement of small media beads. The dried powder is typically collected in a cyclone or a filter. Exemplary inlet gas temperatures range from 150 to 300° C. while the outlet temperature is typically in the range of 100 to 150° C.

Drying can also be accomplished by freeze drying, where the processed dispersion is introduced, continuously or batch wise, into a closed freeze dryer where the combination of freezing the solvent (typically water or water/alcohol mixtures) and applying a high vacuum sublimates the frozen solvent. The dried material is collected after all solvent has been removed and after the vacuum has been released.

The drying step may optionally be carried out multiple times. If carried out multiple times, different combinations of drying techniques may be employed. Multiple drying steps may for example be carried out by subjecting the material to hot air (or a flow of an inert gas such as nitrogen or argon) in an oven/furnace, by spray drying, flash or fluid bed drying, fluidized bed drying, vacuum drying or any combination thereof.

In some embodiments, the drying step is conducted at least twice, preferably wherein the drying step comprises at least two different drying techniques selected from the group consisting of subjecting to hot air in an oven/furnace, spray drying, flash or fluid bed drying, fluidized bed drying and vacuum drying.

In certain embodiments, drying is accomplished in an oven, for example, in air at a temperature of at least about 100° C., for example, at least about 105° C., or at least about 110° C. In other embodiments, drying is done by spray drying, for example, at a temperature of at least about 50° C., or at least about 60° C., or at least about 70° C.

Silicon-carbon particulate composite

The silicon-carbon particulate composite which may be used has one or more of:
(i) microporosity of at least 5.0%, optionally no greater than about 25.0%,
(ii) a BJH average pore width of less than about 250 Å, and
(iii) a BJH volume of pores of from about 0.05 cm$^3$/g to about 0.25 cm$^3$/g.

By "silicon-carbon particulate composite" is meant a particulate composite in which individual particles have a morphology other than a one-dimensional morphology such as nanotubes or nanowires.

In certain embodiments, the silicon-carbon particulate composition has one or more of:
(i) a microporosity of from about 5.0% to about 20%,
(ii) a BJH average pore width of from about 50 Å to about 200 Å, and
(iii) a BJH volume of pores of at least about 0.10 cm$^3$/g In certain embodiments (which may be referred to as Embodiment A), the silicon-carbon particulate has one or more of:
(i) a microporosity of from about 5% to about 20%, for example, from about 8-17%
(ii) a BJH average pore width of from about 75 Å to about 150 Å, for example, from about 100-150 Å, and, (iii) a BJH volume of pores of at least about 0.50 cm³/g, for example, from about 0.50 cm³/g to about 1.25 cm³/g.

In such embodiments, the microporosity may be from about 10-20%, or from about 12-18%, or from about 13-17%, the BJH average pore width may be from about 100 Å to about 150 Å, or from about 120-150 Å, or from about 120-140 Å, and the BJH volume of pores may be at least about 0.75 cm³/g, for example, from about 0.75-1.25 cm³/g, or from about 0.90-1.10 cm³/g.

In such embodiments, the microporosity may be from about 5-15%, or from about 7-13%, or from about 8-11%, the BJH average pore width may be from about 75 Å to about 135 Å, or from about 90-120 Å, or from about 100-120 Å, and the BJH volume of pores may be at least about 0.60 cm³/g, for example, from about 0.70-1.10 cm³/g, or from about 0.80-1.00 cm³/g.

In certain embodiments (which may be referred to as Embodiment B), the silicon-carbon particulate has one or more of:
  (i) a microporosity of from about 5% to about 15%, for example, from about 10-15%
  (ii) a BJH average pore width of from about 100 Å to about 180 Å, for example, from about 130 Å to about 150 Å, and
  (iii) a BJH volume of pores of at least about 0.10 cm³/g, for example, from about 0.10 cm³/g to about 0.25 cm³/g.

In such embodiments, the microporosity may be from about 8-17%, or from about 10-15%, or from about 11-14%, the BJH average pore width may be from about 120 Å to about 160 Å, or from about 125-150 Å, or from about 135-145 Å, and the BJH volume of pores may be at least about 0.12 cm³/g, for example, from about 0.12-0.18 cm³/g, or from about 0.90-1.10 cm³/g.

In certain embodiments, the silicon-carbon particulate at least two of (i), (ii) and (iii), for example, (i) and (ii), or (ii) and (iii), or (i) and (iii). In certain embodiments, the silicon-carbon-particulate has each of (i), (ii) and (iii).

In certain embodiments, the silicon-carbon particulate composite may be further characterized in having:
  (1) a BET specific surface area (SSA) equal to or lower than about 400 m²/g; and/or
  (2) an average particle size of from about 50-2000 Å.

In certain embodiments, the silicon-carbon particulate composite has an average particle size of from about 50-1750 Å, or from about 50-1500 Å, or from about 50-1250 Å, or from about 50-1000 Å, or from about 50-750 Å.

The BET SSA, pore volume and average particle size may vary depending on the amount of silicon in the silicon-carbon particulate. For example, at high silicon levels, e.g., a weight ratio of Si:C of at least about 3:1, or at least about 4:1, or at least about 5:1, or at least about 6:1, or at least about 7:1, or at least about 8:1, the BET SSA and pore volume will be higher, and the average particle size will be lower, compared to a silicon-carbon particulate in which the weight ratio of Si:C is at least about 1:3, or at least about 1:4, or at least about 1:5, or at least about 1:6, or at least about 1:7, or at least about 1:8.

Thus, in certain embodiments, such as Embodiment A, the silicon-carbon particulate composite may be further characterized in having:
  (1) a BET specific surface area (SSA) of from about 100 to about 400 m²/g, for example, from about 200-400 m²/g, or from about 250-350 m²/g, or from about 275-325 m²/g, or from about 275-300 m²/g, or from about 300-325 m²/g; and/or
  (2) an average particle size of from about 50 Å to about 300 Å, for example, from about 50-200 Å, or from about 50-150 Å, or from about 50-100 Å, or from about 75-100 Å, or from about 80-95 Å.

In such embodiments, the BET SSA may be from about 275-325 m²/g, the average particle size may be from about 50-200 Å, for example, from about 50-150 Å, or from about 50-100 Å, the BJH average pore width may be from about 100 Å to about 140 Å, the BJH volume of pores may be from about 0.75 cm³/g, to about 1.25 cm³/g, and the microporosity may be from about 5-20%, for example, from about 12-18% or from about 8-12%.

In certain embodiments, such as Embodiment B, the silicon-carbon particulate composite may be further characterized in having:
  (1) a BET specific surface area (SSA) of from about 10 m²/g to about 100 m²/g, for example, from about 20-80 m²/g, or from about 20-60 m²/g, or from about 30-50 m²/g, or from about 35-45 m²/g, or from about 40-45 m²/g; and/or
  (2) an average particle size of from about 250 Å to about 1000 Å, for example, from about 450-850 Å, or from about 500-800 Å, or from about 550-700 Å, or from about 575-675 Å, or from about 600-650 Å, or from about 620-640 Å.

In such embodiments, the BET SSA may be from about 30-50 m²/g, the average particle size may be from about 300-1000 Å, for example, from about 500-700 Å, or about 600-650 Å, the BJH average pore width may be from about 130 Å to about 150 Å, the BJH volume of pores may be from about 0.12 cm³/g, to about 0.16 cm³/g, and the microporosity may be from about 8-15%, for example, 10-13%.

In certain embodiments, such as Embodiment A, a majority of the silicon-carbon particulate composite is silicon, based on the total weight of the composite, for example, at least about 60 wt. %, or at least about 70 wt. %, or at least about 80 wt. %, or at least about 90 wt. % of the composite is silicon.

In certain embodiments, such as Embodiment B, a majority of the silicon-carbon particulate composite is carbon, based on the total weight of the composite, for example, at least about 60 wt. %, or at least about 70 wt. %, or at least about 80 wt. %, or at least about 90 wt. % of the composite is carbon.

In certain embodiments, the silicon-carbon particulate composition has a nanostructure which inhibits or prevents silicon pulverization when used as active material in a negative electrode of a Li-ion battery.

By "inhibiting or preventing silicon pulverization" is meant that Li is de-intercalated in a single amorphous phase in a continuous process, more particularly, that the nanostructure promotes the formation of amorphous $Li_xSi$ with the gradual change of X in one continuous phase, and in the substantial absence of the formation of two phases containing crystalline Si and crystalline $Li_{15}S_4$. The formation of crystalline $Li_{15}S_4$ is detectable in a $1^{st}$ cycle Li intercalation and de-intercalation curve by the presence of a characteristic plateau in the de-intercalation curve part way between full charge and full discharge. The plateau is characterized in that the Potential vs. Li/Li+[V] (which is the Y-axis of the $1^{st}$ cycle Li intercalation and de-intercalation curve) changes by no more than about 0.05 V across a Specific Charge/372 mAh/g (which is the X-axis of the $1^{st}$ cycle Li interaction and de-intercalation curve) of 0.2. Without wishing to be bound by theory, it is believed that the silicon-carbon particulate composite reduces the extent of volume expansion during lithium intercalation, by preventing or at least inhibiting the formation of Si—Li crystalline alloy phases, and promotes the formation of an amorphous $Li_xSi$ phase, and moreover provides sufficient pore void space to better accommodate said volume expansion during lithiation, thus improving cycling stability and/or reducing capacity losses during cycling of the Li-ion battery. The result is improvement in cycle stability and reduction in specific charge loss.

Additionally or alternatively, therefore, in certain embodiments, the silicon particulate has a nanostructure which maintains electrochemical capacity of a negative electrode, of a Li-ion battery when used as active material. By "maintains electrochemical capacity", means that the specific charge of the negative electrode after 100 cycles is at least 85% of the specific charge after 10 cycles, for example, at least 90% of the specific charge after 10 cycles, or at least 95% of the specific charge after 10 cycles. In other words, the negative electrode comprising the silicon particulate may have at least 85% capacity retention after 100 cycles, for example, at least 90% capacity retention after 100 cycles, or at least 95% capacity retention after 100 cycles.

In certain embodiments, the silicon-carbon particulate composite is prepared by co-milling silicon and carbon starting materials under wet conditions, i.e., by wet-milling, in accordance with the methods described herein.

Method of Making Silicon-Carbon Particulate Composite

The silicon-carbon particulate composite may be manufactured by co-milling silicon particulate and carbonaceous particulate starting materials under wet conditions to produce a silicon-carbon particulate composite according to the first aspect and/or having a nanostructure which inhibits or prevents silicon pulverization and/or maintains electrochemical capacity when use as active material in a negative electrode of a Li-ion battery. By "wet conditions" or "wet-milling" is meant milling in the presence of a liquid, which may be organic, aqueous or a combination thereof.

In certain embodiments, the silicon particulate starting material comprises silicon microparticles having particle sizes of from about 1 µm to about 100 µm, for example, from about 1 µm to about 75 µm, or from about 1 µm to about 50 µm, or from about 1 µm to about 25 µm, or from about 1 µm to about 10 µm. In certain embodiments, the silicon particulate starting material is a micronized silicon particulate having a particle size of from about 1 µm to about 10 µm. Carbonaceous particulate starting materials are described below.

In certain embodiments, the method comprises one or more of the following:
(i) wet-milling in the presence of a solvent, for example, an aqueous alcohol-containing mixture,
(ii) wet-milling in a rotor-stator mill, a colloidal mill or a media mill,
(iii) wet-milling under conditions of high shear and/or high power density,
(iv) wet-milling in the presence of relatively hard and dense milling media, and
(v) drying In certain embodiments, the method comprise two or more of (i), (ii), (iii) and (iv) followed by drying, for example, three or more of (i), (ii), (iii) and (iv) followed by drying, or all of (i), (ii), (iii) and (iv) followed by drying.

(i) Wet Milling in the Presence of a Solvent

In certain embodiments, the solvent is an aqueous alcohol-containing mixture may comprise water and alcohol in a weight ratio of from about 10:1 to about 1:1, for example, from about 8:1 to about 2:1, or from about 6:1 to about 3:1, or from about 5:1 to about 4:1. The total amount of liquid may be such to produce a slurry of the silicon particulate starting material having a solids content of no greater than about 30 wt. %, for example, no greater than about 25 wt. %, or no greater than about 20 wt. %, or no greater than about 15 wt. %, or at least about 5 wt. %, or at least about 10 wt. %. The liquid plus silicon particulate starting material and carbonaceous particulate starting material may be in the form of a slurry. In these embodiments, the alcohol could be replaced with an organic solvent other than an alcohol, or a mixture of organic solvents comprising alcohol and another organic solvents, or a mixture of organic solvents other than alcohol, with the weight ratios given above pertaining to the total amount of organic solvent.

The alcohol may be a low molecular weight alcohol having up to about 4 carbon atoms, for example, methanol, ethanol, propanol or butanol. In certain embodiments, the alcohol is propanol, for example, isopropanol.

(ii) and (iii)

In certain embodiments, the wet-milling is conducted in a rotor stator mill, a colloidal mill or a media mill. These mills are similar in that they can be used to generate high shear conditions and/or high power densities.

A rotor-stator mill comprises a rotating shaft (rotor) and an axially fixed concentric stator. Toothed varieties have one or more rows of intermeshing teeth on both the rotor and the stator with a small gap between the rotor and stator, which may be varied. The differential speed between the rotor and the stator imparts extremely high shear. Particle size is reduced by both the high shear in the annular region and by particle-particle collisions and/or particle-media collisions, if media is present.

A colloidal mill is another form of rotor-stator mill. It is composed of a conical rotor rotating in a conical stator. The surface of the rotor and stator can be smooth, rough or slotted. The spacing between the rotor and stator is adjustable by varying the axial location of the rotor to the stator. Varying the gap varies not only the shear imparted to the particles but also the mill residence time and the power density applied. Particle size reduction may be affected by adjusting the gap and the rotation rate, optionally in the presence of media.

Media mills are different in operation than a rotor-stator mill but likewise can be used to generate high shear conditions and power densities. The media mill may be a pearl mill or bead mill or sand mill. The mill comprises a milling chamber and milling shaft. The milling shaft typically extends the length of the chamber. The shaft may have either radial protrusions or pins extending into the milling chamber, a series of disks located along the length of the chamber, or a relatively thin annular gap between the shaft mill chamber. The typically spherical chamber is filled with the milling media. Media is retained in the mill by a mesh screen located at the exit of the mill. The rotation of the shaft causes the protrusions to move milling media, creating conditions of high shear and power density. The high energy and shear that result from the movement of the milling media is imparted to the particles as the material is circulated through the milling chamber.

The rotation speed within the mill may be at least about 5 m/s, for example, at least about 7 m/s or at least about 10 m/s. The maximum rotation speed may vary from mill to mill, but typically is no greater than about 20 m/s, for example, no greater than about 15 m/s. Alternatively, the speed may be characterized in terms of rpm. In certain embodiments, the rpm of the rotor-stator or milling shaft in the case of a media mill may be at least about 5000 rpm, for example, at least about 7500 rpm, or at least about 10,000 rpm, or at least about 11,000 rpm. Again, maximum rpm may be vary from mill to mill, but typically is no greater than about 15,000 rpm. Power density may be at least about 2 kW/l (l=liter of slurry), for example, at least about 2.5 kW/l, or at least about 3 kW/l. In certain embodiments, the power density is no greater than about 5 kW/l, for example, no greater than about 4 kW/l.

In certain embodiments, the rpm of the rotor-stator or milling shaft in the case of a media mill may be at least about 500 rpm, for example, at least about 750 rpm, or at least about 1000 rpm, or at least about 1500 rpm. Again, maximum rpm may be vary from mill to mill, but typically is no greater than about 3000 rpm.

Residence in time within the mill is less than 24 hours, for example, equal to or less than about 18 hours, or equal to or less than about 12 hours, or equal to or less than about 6 hours, or equal to or less than about 4 hours, or equal to or less than about 220 minutes, or equal to or less than about 200 minutes, or equal to or less than about 180 minutes, or equal to or less than about 160 minutes, or equal to or less than about 140 minutes, or equal to or less than about 120 minutes, or equal to or less than about 100 minutes, or equal to or less than about 80 minutes, or equal to or less than about 60 minutes, or equal to or less than about 40 minutes, or equal to or less than about 20 minutes.

(iv) Wet-Milling in the Presence of Relatively Hard and Dense Milling Media

In certain embodiments, the milling media is characterized by having a density of at least about 3 g/cm$^3$, for example, at least about 3.5 g/cm$^3$, or at least about 4.0 g/cm$^3$, or at least about 4.5 g/cm$^3$, or at least about 5.0 g/cm$^3$, or at least about 5.5 g/cm$^3$, or at least about 6.0 g/cm$^3$.

In certain embodiments, the milling media is a ceramic milling media, for example, yttria-stabilized zirconia, ceria-stabilized zirconia, fused zirconia, alumina, alumina-silica, alumina-zirconia, alumina-silica-zirconia, and ytrria or ceria stabilized forms thereof. The milling media, for example, ceramic milling media, may be in the form of beads. The milling media, for example, ceramic milling media may have a size of less than about 10 mm, for example, equal to or less than about 8 mm, or equal to or less than about 6 mm, or equal to or less than about 4 mm, or equal to or less than about 2 mm, or equal to or less than about 1 mm, or equal to or less than about 0.8 mm, or equal or less than about 0.6 mm, or equal to or less than about 0.5 mm. In certain embodiments, the milling media has a size of at least 0.05 mm, mm, for example, at least about 0.1 mm, or at least about 0.2 mm, or at least about 0.3 mm, or at least about 0.4 mm.

In certain embodiments, wet milling is conducted in a planetary ball mill with milling media, for example, ceramic milling media, having a size of up to about 10 mm.

(v) Drying

Drying may be effected by any suitable technique and any suitable equipment as described above. In certain embodiments, drying is accomplished in an oven, for example, in air at a temperature of at least about 100° C., for example, at least about 105° C., or at least about 110° C. In certain embodiments, drying is done by spray drying, for example, at a temperature of at least about 50° C., or at least about 60° C., or at least about 70° C.

In certain embodiments, the carbonaceous particulate starting material(s) is selected from natural graphite, synthetic graphite, coke, exfoliated graphite, graphene, few-layer graphene, graphite fibers, nano-graphite, non-graphitic carbon, carbon black, petroleum- or coal based coke, glass carbon, carbon nanotubes, fullerenes, carbon fibers, hard carbon, graphitized fined coke, or mixtures thereof.

In certain embodiments, the carbonaceous particulate starting material is graphite, for example, natural or synthetic graphite, exfoliated graphite, or an expanded graphite, or combinations thereof, for example, a combination of expanded graphite and a synthetic graphite. In certain embodiments, the synthetic graphite is surface-modified, for example, coated, for example, with an amorphous coating. In certain embodiments, the synthetic graphite is not surface-modified. Other specific carbonaceous particulate starting materials are exfoliated graphites as described in WO 2010/089326 (highly oriented grain aggregate graphite, or HOGA graphite), or in co-pending EP application no. 16 188 344.2 (wet-milled and dried carbonaceous sheared nano-leaves) filed on Sep. 12, 2016.

The carbonaceous particulate starting material or materials may be selected such that following co-milling they provide a carbon matrix having a BET SSA which is suitable for use in negative electrodes of a Li-ion battery.

In certain embodiments, the silicon particulate starting material is initially milled in the absence of carbonaceous particulate starting material, for example, for a period of up to about 1 hour, up to about 45 mins, or up to about 30 mins, or up to about 15 mins, and then combined with carbonaceous particulate starting material and co-milled for a further period.

In certain embodiments, the carbonaceous particulate starting is added gradually or in batches during the co-milling process.

In other embodiments, the carbonaceous particulate starting material is initially milled in the absence of silicon particulate starting material, and then combined with silicon particulate starting material and co-milled for a further period.

In certain embodiments, the silicon particulate starting materials is added gradually or in batches during the co-milling process.

The Carbon Matrix

In certain embodiments, the carbon matrix has a (bulk) BET specific surface area (SSA) which is suitable for use in a negative electrode of a Li-ion battery. In certain embodiments, the carbon matrix has a BET SSA lower than about 10 m$^2$/g, for example, from about 2.0 m$^2$/g to about 9.0 m$^2$/g, or from about 2.0 m$^2$/g to about 8.0 m$^2$/g, or from about 3.0 m$^2$/g to about 7.0 m$^2$/g, or from about 3.0 m$^2$/g to about 6.5 m$^2$/g, or from about 3.5 m$^2$/g to about 6.0 m$^2$/g, or from about 4.0 m$^2$/g to about 6.0 m$^2$/g, or from about 4.5 m$^2$/g to about 6.0 m$^2$/g, or from about 4.5 m$^2$/g to about 5.5 m$^2$/g, or from about 4.5 to about 5.0 m$^2$/g, or from about 4.0 m$^2$/g to about 5.0 m$^2$/g.

The BET SSA of the first carbonaceous particulate material is lower than the BET SSA of the second carbonaceous particulate material and of the carbon matrix. In certain embodiments, the first carbonaceous particulate has a BET SSA of less than about 8.0 m$^2$/g, for example, from about 1.0 m$^2$/g to about 7.0 m$^2$/g, or from about 2.0 m$^2$/g to about 6.0 m$^2$/g, or from about 2.0 m$^2$/g to about 5.0 m$^2$/g, or from about 2.0 m$^2$/g to about 4.0 m$^2$/g, or from about 2.0 m$^2$/g to about 3.0 m$^2$/g, or from about 3.0 m$^2$/g to about 4.0 m$^2$/g.

In certain embodiments, the first carbonaceous particulate has a particle size distribution as follows:

a $d_{90}$ of at least about 10 μm, for example, at least about 15 μm, or at least about 20 μm, or at least about 25 μm, or at least about 30 μm, optionally less than about 50 μm, or less than about 40 μm; and/or a $d_{50}$ of at least about 5 µm to about 20 µm, for example, from about 10 µm to about 20 µm, or from about 10 µm to about 15 µm, or from about 15 µm to about 20 µm; and/or a $d_{10}$ of from about 2 µm to about 10 µm, for example, from about 3 µm to about 9 µm, or from about 3 µm to about 6 µm, or from about 5 µm µm to about 9 µm.

In certain embodiments, the first carbonaceous particulate has a relatively high spring back of at least about 20%, for example, at least about 30%, or at least about 40%, or at least about 50%, or at least about 60%. In certain embodiments, the first carbonaceous particulate has a spring back of from about 40% to about 70%, for example, from about 45% to about 65%, for example, from about 45% to about 55%, or from about 60% to about 70%, or from about 50% to about 60%.

In certain embodiments, the first carbonaceous particulate material is graphite, for example, synthetic graphite or natural graphite, or a mixture thereof. In certain embodiments, the first carbonaceous particulate material is a mixture of synthetic graphite materials.

In certain embodiments, the first carbonaceous particulate material is or comprises (e.g., in admixture with another carbonaceous particulate material) a surface-modified synthetic graphite, for example synthetic graphite which has been surface modified by either chemical vapor deposition ("CVD coating") or by controlled oxidation at elevated temperatures. In certain embodiments, the synthetic graphite prior to surface-modification is characterized by characterized by a BET SSA of from about 1.0 to about 4.0 m$^2$/g, and by exhibiting a ratio of the perpendicular axis crystallite size $L_c$ (measured by XRD) to the parallel axis crystallite size $L_a$ (measured by Raman spectroscopy), i.e. $L_c/L_a$ of greater than 1. Following surface-modification, the synthetic graphite is characterized by an increase of the ratio between the crystallite size $L_c$ and the crystallite size $L_a$. In other words, the surface-modification process lowers the crystallite size $L_a$ without substantially affecting the crystallite size $L_c$. In one embodiment, the surface-modification of the synthetic graphite is achieved by contacting the untreated synthetic graphite with oxygen at elevated temperatures for a sufficient time to achieve an increase of the ratio $L_c/L_a$, preferably to a ratio of >1, or even greater, such as >1.5, 2.0, 2.5 or even 3.0. Moreover, the process parameters such as temperature, amount of oxygen-containing process gas and treatment time are chosen to keep the burn-off rate relatively low, for example, below about 10%, below 9% or below 8%. The process parameters are selected so as to produce a surface-modified synthetic graphite maintaining a BET surface area of below about 4.0 m$^2$/g.

The process for modifying the surface of synthetic graphite may involve a controlled oxidation of the graphite particles at elevated temperatures, such as ranging from about 500 to about 1100° C. The oxidation is achieved by contacting the synthetic graphite particles with an oxygen-containing process gas for a relatively short time in a suitable furnace such as a rotary furnace. The process gas containing the oxygen may be selected from pure oxygen, (synthetic or natural) air, or other oxygen-containing gases such as CO2, CO, H2O (steam), O3, and NOx. It will be understood that the process gas can also be any combination of the aforementioned oxygen-containing gases, optionally in a mixture with an inert carrier gas such as nitrogen or argon. It will generally be appreciated that the oxidation process runs faster with increased oxygen concentration, i.e., a higher partial pressure of oxygen in the process gas. The process parameters such as treatment time (i.e. residence time in the furnace), oxygen content and flow rate of the process gas as well as treatment temperature are chosen to keep the burn off rate below about 10% by weight, although it is in some embodiments desirable to keep the burn-off rate even lower, such as below 9%, 8%, 7%, 6% or 5%. The burn-off rate is a commonly used parameter, particularly in the context of surface oxidation treatments, since it gives an indication on how much of the carbonaceous material is converted to carbon dioxide thereby reducing the weight of the remaining surface-treated material.

The treatment times during which the graphite particles are in contact with the oxygen-containing process gas (e.g. synthetic air) may be relatively short, thus in the range of 2 to 30 minutes. In many instances the time period may be even shorter such as 2 to 15 minutes, 4 to 10 minutes or 5 to 8 minutes. Of course, employing different starting materials, temperatures and oxygen partial pressure may require an adaptation of the treatment time in order to arrive at a surface-modified synthetic graphite having the desired structural parameters as defined herein. Oxidation may be achieved by contacting the synthetic graphite with air or another oxygen containing gas at a flow rate generally ranging from 1 to 200 l/min, for example, from 1 to 50 l/min, or from 2 to 5 l/min. The skilled person will be able to adapt the flow rate depending on the identity of the process gas, the treatment temperature and the residence time in the furnace in order to arrive at a surface-modified graphite.

Alternatively, the synthetic graphite starting material is subjected to a CVD coating treatment with hydrocarbon-containing process gas at elevated temperatures for a sufficient time to achieve an increase of the ratio $L_c/L_a$, preferably to a ratio of >1, or even greater, such as >1.5, 2.0, 2.5 or even 3.0. Suitable process and surface-modified synthetic graphite materials are described in U.S. Pat. No. 7,115,221, the entire contents of which are hereby incorporated by reference. The CVD process coats the surface of graphite particles with mostly disordered (i.e., amorphous) carbon-containing particles. CVD coating involves contacting the synthetic graphite starting material with a process gas containing hydrocarbons or a lower alcohol for a certain 30 time period at elevated temperatures (e.g. 500° to 1000° C.). The treatment time will in most embodiments vary from 2 to 120 minutes, although in many instances the time during which the graphite particles are in contact with the process gas will only range from 5 to 90 minutes, from 10 to 60 minutes, or from 15 to 30 minutes. Suitable gas flow rates can be determined by those of skill in the art. In some embodiments, the process gas contains 2 to 10% of acetylene or propane in a nitrogen carrier gas, and a flow rate of around 1 m$^3$/h.

In certain embodiments, the first carbonaceous particulate, for example, the surface-modified synthetic graphite as described in the preceding paragraphs, may have, in addition to the BET SSA, particle size distribution and spring back described above, one or more of the following properties:

an interlayer spacing c/2 (as measured by XRD) of equal to or less than about 0.337 nm, for example, equal to or less than about 0.336;

a crystallite size $L_c$ (as measured by XRD) of from 100 nm to about 175 nm, for example, from about 140 nm to about 170 nm;

a xylene density of from about 2.22 to about 2.24 g/cm$^3$, for example, from about 0.225 to about 0.235 g/cm$^3$;

a Scott density of from about 0.25 g/cm$^3$ to about 0.75 g/cm$^3$, for example, from about 0.40 to about 0.50 g/cm$^3$.

In certain embodiments, the first carbonaceous particulate is or comprises (e.g., in admixture with another carbonaceous particulate material) a synthetic graphite which has not been surface-modified, i.e., a non-surface-modified synthetic graphite. In addition to the BET SSA, particle size distribution and spring back described above, the non-surface modified synthetic particulate may have on or more of the following properties:

an interlayer spacing c/2 (as measured by XRD) of equal to or less than about 0.337 nm, for example, equal to or less than about 0.336;

a crystallite size $L_c$ (as measured by XRD) of from 100 nm to about 150 nm, for example, from about 120 nm to about 135 nm;

a xylene density of from about 2.23 to about 2.25 g/cm$^3$, for example, from about 0.235 to about 0.245 g/cm$^3$;

a Scott density of from about 0.15 g/cm$^3$ to about 0.60 g/cm$^3$, for example, from about 0.30 to about 0.45 g/cm$^3$.

In certain embodiments, the non-surface-modified synthetic graphite is prepared according to the methods described in WO 2010/049428, the entire contents of which are hereby incorporated by reference.

In certain embodiments, the first carbonaceous particulate is a mixture of the surface-modified synthetic graphite described here and the non-surface modified synthetic graphite described herein.

The weight ratio of the such a mixture may vary from 99:1 to about 1:99 ([surface modified]:[non-surface-modified]), for example, from about 90;10 to about 10:90, or from about 80:20 to about 20:80, or from about 70:30 to about 30:70, or from about 60:40 to about 40:60, or from about 50:50 to about 30:70, or from about 45:55 to about 35:65.

Relative to the first carbonaceous particulate material, the additional carbonaceous particulate materials have a higher BET SSA and/or lower spring back, for example, a higher BET SSA and lower spring back.

The BET SSA of the second carbonaceous particulate material is higher than the BET SSA of the first carbonaceous particulate material and of the carbon matrix and, when, present, the BET SSA of the third carbonaceous particulate material is higher than the BET SSA of the second carbonaceous particulate material and, when present, the BET SSA of a fourth carbonaceous particulate material is higher than the BET SSA of the third carbonaceous particulate material.

Embodiment A

In certain embodiments, the second carbonaceous particulate material has a BET SSA higher than about 8 m$^2$/g and lower than about 20 m$^2$/g, for example, lower than about 15 m$^2$/g, or lower than about 12 m$^2$/g, or lower than about 10 m$^2$/g. In such embodiments, the third carbonaceous particulate material, when present, has a BET SSA higher than about 20 m$^2$/g, for higher than about 25 m$^2$/g, or higher than about 30 m$^2$/g, optionally lower than about 40 m$^2$/g, for example, lower than about 35 m$^2$/g. example. In such embodiments, the second or third, when present, or both of the second and third carbonaceous particulate materials, may have a spring back of less than 20%, for example, less than about 18%, or less than about 16%, or less than about 14%, or equal to or less than about 12%, or equal to or less than about 10%. In such embodiments, the precursor composition may comprise a fourth carbonaceous particulate material having a BET SSA of at least about 40 m$^2$/g and lower than about 100 m$^2$/g, for example, lower than about 80 m$^2$/g, or lower than about 60 m$^2$/g, or lower than about 50 m$^2$/g. In such embodiments, the fourth carbonaceous particulate may be carbon black. In other embodiments, the carbon black, when present as the fourth carbonaceous particulate, may have a BET SSA of less than about 1200 m$^2$/g, for example, lower than about 1000 m$^2$/g or lower than about 800 m$^2$/g, or lower than about 600 m$^2$/g, or lower than about 400 m$^2$/g, or lower than about 200 m$^2$/g.

In certain embodiments of Embodiment A, which may be referred to as Embodiment A1, the third carbonaceous particulate is not present, in which case the fourth carbonaceous particulate may be regarded as the third carbonaceous particulate material.

In certain embodiments, the second carbonaceous particulate material has a particle size distribution as follows:

a $d_{90}$ of at least about 8 µm, for example, at least about 10 µm, or at least about 12 µm, optionally less than about 25 µm, or less than about 20 µm; and/or a $d_{50}$ of from about 5 µm to about 12 µm, for example, from about 5 µm to about 10 µm, or from about 7 µm to about 9 µm; and/or a $d_{10}$ of from about 1 µm to about 5 µm, for example, from about 2 µm to about 5 µm, or from about 3 µm to about 5 µm, or from about 3 µm µm to about 4 µm.

In Embodiment A and A1, the second carbonaceous particulate may be a carbonaceous material that has not undergone any surface modification, such as coating with non-graphitic carbon or surface oxidation. On the other hand, the term unmodified in this context still allows purely mechanical manipulation of the carbonaceous particles because the particles in many embodiments may need to be milled or otherwise subjected to other mechanical forces, for example in order to obtain the desired particle size distribution.

In some embodiments, the second carbonaceous particulate material is natural or synthetic graphite, optionally a highly crystalline graphite. As used herein, "highly crystalline" preferably refers to the crystallinity of the graphite particles characterized by the interlayer distance c/2, by the real density (xylene density), and/or the size of the crystalline domains in the particle (crystalline size Lc).

In such embodiments, a highly crystalline carbonaceous material may be characterized by a c/2 distance of ≤0.3370 nm, or ≤0.3365 nm, or ≤0.3362 nm, or ≤0.3360 nm, and/or by a xylene density above 2.230 g/cm$^3$, and/or by an Lc of at least 20 nm, or at least 40 nm, or at least 60 nm, or at least 80 nm, or at least 100 nm, or more.

In addition to the BET SSA, particle size distribution and spring back described above, the second carbonaceous particulate material may have on or more of the following properties:

a crystallite size $L_c$ (as measured by XRD) from 100 to 300 nm, or from 100 nm to 250 nm, or from 100 nm to 200 nm, or from 150 nm to 200 nm;

a Scott density of less than about 0.2 g/cm$^3$, or less than about 0.15 g/cm$^3$, or less than about 0.10 g/cm$^3$, optionally greater than about 0.05 g/cm$^3$;

a xylene density from 2.24 to 2.27 g/cm$^3$, or from 2.245 to 2.26 g/cm$^3$, or from 2.245 and 2.255 g/cm$^3$.

In certain embodiments, the second carbonaceous particulate material is a non-surfaced-modified synthetic graphite. For the avoidance of doubt, such a non-surfaced-modified synthetic graphite is distinct from the non-surfaced-modified synthetic graphite described in embodiments pertaining to the first carbonaceous particulate material.

In certain embodiments, the non-surface modified synthetic graphite may be made by graphitization of a petroleum based coke at temperatures above about 2500° C. under an inert gas atmosphere and then milled or ground to the appropriate particle size distribution. Alternatively, the second carbonaceous particulate may be made by grinding or milling a chemically or thermally purified natural flake graphite to the appropriate particle size distribution.

In Embodiment A, but not A1, the third carbonaceous particulate material, when present, may be as defined below as the second carbonaceous particulate material in Embodiment B.

In addition to the BET SSA described above, the fourth carbonaceous particulate material of Embodiment A, the third carbonaceous particulate material of Embodiment A1, and the third carbonaceous particulate material of Embodiment B below, may be further characterized by having one or more of the following properties:

a crystallite size $L_c$ (as measured by XRD) of less than 20 nm, for example, less than 10 nm, or less than 5 nm, or less than 4 nm, or less than 3 nm, optionally at least 0.5 nm, or at least 1 nm;

a Scott density of less than about 0.2 $g/cm^3$, or less than about 0.15 $g/cm^3$, or less than about 0.10 $g/cm^3$, or less than about 0.08 $g/cm^3$, or less than about 0.06 $g/cm^3$, optionally greater than about 0.05 $g/cm^3$;

a xylene density of less than about 2.20 $g/cm^3$, for example, less than about 0.15 $g/cm^3$, optionally greater than about 2.10 $g/cm^3$, for example, from about 2.11 to about 2.15 $g/cm^3$, or from about 2.12 to about 2.14 $g/cm^3$, or from about 2.125 to about 2.135 $g/cm^3$.

Embodiment B

In certain embodiments, the second carbonaceous particulate material has a BET SSA higher than about 20 $m^2/g$, for example, higher than about 25 $m^2/g$, or higher than about 30 $m^2/g$, optionally lower than about 40 $m^2/g$, for example, lower than about 35 $m^2/g$. In such embodiments, the second carbonaceous particulate material may have a spring back of less than 20%, for example, less than about 18%, or less than about 16%, or less than about 14%, or equal to or less than about 12%, or equal to or less than about 10%. In such embodiments, a further carbonaceous particulate may be present as a third carbonaceous particulate. The third carbonaceous particulate material may have a BET SSA of at least about 40 $m^2/g$ and lower than about 100 $m^2/g$, for example, lower than about 80 $m^2/g$, or lower than about 60 $m^2/g$, or lower than about 50 $m^2/g$. In such embodiments, the third carbonaceous particulate may be carbon black. In other embodiments, the carbon black, when present as the third carbonaceous particulate, may have a BET SSA of less than about 1200 $m^2/g$, for example, lower than about 1000 $m^2/g$ or lower than about 800 $m^2/g$, or lower than about 600 $m^2/g$, or lower than about 400 $m^2/g$, or lower than about 200 $m^2/g$.

In certain embodiments of Embodiment B, the second carbonaceous particulate material may be graphite, for example, natural or synthetic graphite. In certain embodiments, the second carbonaceous particulate material is natural graphite. In certain embodiments, the natural graphite is an exfoliated natural graphite. In certain embodiments, the second carbonaceous particulate is synthetic graphite, for example, an exfoliated synthetic graphite, such as those described in WO 2010/089326 (highly oriented grain aggregate graphite, or HOGA graphite), or in co-pending EP application no. no. 16 188 344.2 (wet-milled and dried carbonaceous sheared nano-leaves) filed on Sep. 12, 2016.

In certain embodiments, the second carbonaceous particulate material of Embodiment B has a particle size distribution as follows:

a $d_{90}$ of at least about 4 µm, for example, at least about 6 µm, or at least about 8 µm, optionally less than about 15 µm, or less than about 12 µm; and/or a $d_{50}$ of from about 2 µm to about 10 µm, for example, from about 5 µm to about 10 µm, or from about 6 µm to about 9 µm; and/or a $d_{10}$ of from about 0.5 µm to about 5 µm, for example, from about 1 µm to about 4 µm, or from about 1 µm to about 3 µm, or from about 1.5 µm to about 2.5 µm.

In addition to the BET SSA, particle size distribution and spring back described above, the second carbonaceous particulate material may have on or more of the following properties:

a crystallite size $L_c$ (as measured by XRD) from 5 to 75 nm, or from 10 nm to 50 nm, or from 20 nm to 40 nm, or from 20 nm to 35 nm, or 20 to 30 nm, or 25 to 35 nm;

a Scott density of less than about 0.2 $g/cm^3$, or less than about 0.15 $g/cm^3$, or less than about 0.10 $g/cm^3$, or less than about 0.08 $g/cm^3$, optionally greater than about 0.04 $g/cm^3$;

a xylene density from 2.24 to 2.27 $g/cm^3$, or from 2.245 to 2.26 $g/cm^3$, or from 2.245 and 2.255 $g/cm^3$.

Embodiment C

In certain embodiments, the second carbonaceous particulate material has a BET SSA of at least about 40 $m^2/g$ and lower than about 100 $m^2/g$, for example, lower than about 80 $m^2/g$, or lower than about 60 $m^2/g$, or lower than about 50 $m^2/g$. In such embodiments, the second carbonaceous particulate may be carbon black. The second carbonaceous particulate material of Embodiment C may be the same material as the fourth carbonaceous particulate material of Embodiment A. In other embodiments, the carbon black, when present as the second carbonaceous particulate, may have a BET SSA of less than about 1200 $m^2/g$, for example, lower than about 1000 $m^2/g$ or lower than about 800 $m^2/g$, or lower than about 600 $m^2/g$, or lower than about 400 $m^2/g$, or lower than about 200 $m^2/g$.

Precursor Composition

Based on the total weight of carbonaceous particulate material in the precursor composition (i.e., the carbon matrix), the first carbonaceous particulate material may be present in an amount up to about 99 wt. %, for example, from about 50 wt. % to about 99 wt. %, or from about 60 wt. % to about 98 wt. %, or from about 70 wt. % to about 95 wt. %, or from about 80 wt. % to about 95 wt. %, or from about 90 wt. % to about 95 wt. %, with the balance one or more of the other carbonaceous particulate materials described herein.

In certain embodiments, the second carbonaceous particulate material and, when present, third carbonaceous particulate material, may be present in amount up to about 10 wt. % of each (i.e., up to 20 wt. % in total), based on the total weight of the carbonaceous particulate material, for example, up to about 8 wt. % (of each), or up to about 6 wt. % (of each), or up to about 4 wt. % (of each), or up to about 2 wt. % (of each).

In certain embodiments, the precursor composition comprises at least about 1 wt. % of a second carbonaceous particulate.

In certain embodiments, for example, certain embodiments of Embodiment A, the precursor composition comprises up to about 90 wt. % of the first carbonaceous particulate material, from 1-10 wt. % of the second carbonaceous particulate material, from 1-10 wt. % of the third carbonaceous particulate material, when present, and from 1-5 wt. % of the fourth carbonaceous particulate material, when present.

In certain embodiments of Embodiment A, the precursor composition comprises at least about 80 wt. % of the first carbonaceous particulate material, from 2-10 wt. % of the second carbonaceous material, and from 2-10 wt. % of the third carbonaceous particulate material, for example, at least about 85 wt. % of the first carbonaceous particulate material, from 5-9 wt. % of the second carbonaceous particulate material, and from 5-9 wt. % of the third carbonaceous particulate material.

In certain embodiments of Embodiment A1, the precursor composition comprises at least about 85 wt. % of the first carbonaceous particulate material, from 2-10 wt. % of the second carbonaceous material, and from 1-5 wt. % of the third carbonaceous particulate material.

In certain embodiments of Embodiment A, the carbonaceous particulate material consists of the first carbonaceous particulate material and the second carbonaceous material, wherein the amount of first carbonaceous particulate material may be at least 80 wt. %, based on the total weight of the carbonaceous particulate material in the precursor composition, and the amount of the second carbonaceous particulate may be up to about 20 wt. %, for example, at least about 90 wt. % of the first carbonaceous particulate material and up to about 10 wt. % of the second carbonaceous particulate material, or at least about 95 wt. % of the first carbonaceous particulate material and up to about 5 wt. % of the second carbonaceous particulate material.

In certain embodiments of Embodiment B, the precursor composition comprises up to about 90 wt. % of the first carbonaceous particulate material, from 1-10 wt. % of the second carbonaceous particulate material, and from 1-5 wt. % of the fourth carbonaceous particulate material, when present.

In certain embodiments of Embodiment B, the carbonaceous particulate material consists of the first carbonaceous particulate material and the second carbonaceous material, wherein the amount of first carbonaceous particulate material may be at least 80 wt. %, based on the total weight of the carbonaceous particulate material in the precursor composition, and the amount of the second carbonaceous particulate may be up to about 20 wt. %, for example, at least about 90 wt. % of the first carbonaceous particulate material and up to about 10 wt. % of the second carbonaceous particulate material, or at least about 95 wt. % of the first carbonaceous particulate material and up to about 5 wt. % of the second carbonaceous particulate material.

In the various 'Precursor composition' embodiments described above, the first carbonaceous particulate may be a mixture of the surface-modified synthetic graphite described here and the non-surface modified synthetic graphite described herein. The weight ratio of the such a mixture may vary from 99:1 to about 1:99 ([surface modified]:[non-surface-modified]), for example, from about 90;10 to about 10:90, or from about 80:20 to about 20:80, or from about 70:30 to about 30:70, or from about 60:40 to about 40:60, or from about 50:50 to about 30:70, or from about 45:55 to about 35:65.

In the various 'Precursor composition' embodiments described above, the first carbonaceous particulate may constitute a single material rather than a mixture. For example, in certain embodiments, the first carbonaceous particulate material is the surface-modified synthetic graphite described herein. In other embodiments, the first carbonaceous particulate material is the non-surface-modified synthetic graphite described herein.

In certain embodiments, the precursor compositions described herein further comprise an amount of the metal-based nano-particulate active material. The amount of the metal-based nano-particulate active material may be based on the total weight of the precursor composition or the total weight of the negative electrode which is made from the precursor composition, i.e., based on the total weight of the negative electrode.

In certain embodiments, the precursor composition is free of the metal-based nano-particulate active material, i.e., a precursor composition comprising the various combination of carbonaceous particulate materials is prepared following which a suitable amount of the metal-based nano-particulate active material is added.

In certain embodiments, the precursor composition comprises from about 0.1 wt. % to about 90 wt. % of metal-based nano-particulate active material, based on the total weight of the precursor composition, for example, from about 0.1 wt. % to about 80 wt. %, or from about 0.1 wt. % to about 70 wt. %, or from about 0.1 wt. % to about 60 wt. %, or from about 0.1 wt. % to about 50 wt. %. In certain embodiments, the precursor composition comprises from about 0.1 wt. % to about 40 wt. % of metal-based nano-particulate active material, based on the total weight of the precursor composition, for example, from about 0.5 wt. % to about 30 wt. %, or from about 1 wt. % to about 25 wt. %, or from about 1 wt. % to about 20 wt. %, or from about 1 wt. % to about 15 wt. %, or from about 1 wt. to about 10 wt. %, or from about 1 wt. % to about 5 wt. %.

In certain embodiments, the precursor composition comprises from about 1 wt. % to about 90 wt. % of metal-based nano-particulate active material, based on the total weight of the negative electrode, for example, from about 1 wt. % to about 80 wt. %, or from about 1 wt. % to about 70 wt. %, or from about 1 wt. % to about 60 wt. %, or from about 1 wt. % to about 50 wt. %. In certain embodiments, the precursor composition comprises from about 1 wt. % to about 40 wt. % of metal-based nano-particulate active material, based on the total weight of the negative electrode, for example, from about 2 wt. % to about 30 wt. %, or from about 5 wt. % to about 25 wt. %, or from about 7.5 wt. % to about 20 wt. %, or from about 10 wt. to about 17.5 wt. %, or from about 12.5 wt. % to about 15 wt. %.

In the preceding embodiments, the metal-based nano-particulate active material is a silicon active material, for example, elemental silicon active material having a purity of at least about 95%, for example, at least about 98%.

In certain embodiments, precursor composition comprises the following components:
elemental silicon active material in nano-particulate form having an average particle size of less than about 100 nm, for example, from about 20 nm to about 60 nm;
a carbon matrix having a BET SSA of equal to or lower than about 6.0 $m^2/g$
a first carbonaceous particulate having a BET SSA of equal to or lower than about 4.0 $m^2/g$, for example, non-surface-modified synthetic graphite or surface-modified synthetic graphite, or a mixture thereof;
a second carbonaceous particulate having a BET SSA of from about 8.0 $m^2/g$ to about 15 $m^2/g$, for example, from about 8.0 $m^2/g$ to about 12 $m^2/g$, for example, a non-surface treated synthetic graphite; and/or
a third carbonaceous particulate having a BET SSA of at least about 20 $m^2/g$, for example, from about 25 to about 35 $m^2/g$, for example, an exfoliated graphite, such as, for example, an exfoliated natural graphite or an exfoliated synthetic graphite; and
wherein the weight ratio of the first carbonaceous particulate material:second carbonaceous particulate material:third carbonaceous particulate is 80-98: 0-10:0-10, based on the total weight of the carbon matrix, provided that at least one of the second and third carbonaceous particulate materials are present.

In certain embodiments, the precursor composition comprises from 70-90 wt. % first carbonaceous particulate material, for example, 80-90 wt. % first carbonaceous particulate material with the balance the second and/or third carbonaceous particulate material, optionally further comprising a fourth carbonaceous particulate material as it is defined in accordance with Embodiment A.

In certain embodiments, the precursor composition comprises from 80-95 wt. % first carbonaceous particulate material, with the balance one or other of the second and third carbonaceous particulate materials, optionally further comprising a fourth carbonaceous particulate material as it is defined in accordance with Embodiment A.

The precursor compositions described in the preceding three paragraphs may further comprise a sufficient amount of the silicon active material such that a negative electrode formed from the precursor composition comprises at least 1 wt. % of the negative electrode, for example, at least 5 wt. %, or at least 10 wt. %, or at least about 15 wt. %, or at least 20 wt. %.

The precursor composition may be made by mixing the carbonaceous particulates in suitable amounts forming the carbon matrix optionally together with the metal-based nano-particulate material. In certain embodiments, the carbon matrix is prepared, and then the active material is combined with the carbon matrix, again, using any suitable mixing technique. In certain embodiments, the carbon matrix is prepared at a first location and then combined with the active material in a second location. In certain embodiments, a carbon matrix is prepared in a first location and then transported to a second location (e.g., an electrode manufacturing site) where it is combined with active material and optionally additional carbonaceous particulate if desired, and then with any additional components to manufacture a negative electrode therefrom, as described below.

Negative Electrode for a Li-Ion Battery

The precursor compositions as defined herein can be used for manufacturing negative electrodes for Li-ion batteries, in particular Li-ion batteries empowering electric vehicles, or hybrid electric vehicles, or energy storage units.

Thus, another aspect is a negative electrode for a Li-ion battery comprising a metal-based nano-particulate active material, manufactured from a precursor composition according to the first and second aspects and embodiments thereof.

In a related aspect, there is provided a negative electrode comprising at least 1 wt. % of a metal-based nano-particulate active material, based on the total weight of the electrode, and a carbon matrix having a BET SSA of lower than about 10 m$^2$/g, wherein the carbon matrix comprises at least first, second and optional third carbonaceous particulate materials, wherein the BET SSA of the first carbonaceous particulate material is lower than the BET SSA of the second carbonaceous particulate material and of the carbon matrix, wherein the BET SSA of the second carbonaceous particulate material is higher than the BET SSA of the first carbonaceous particulate and of the carbon matrix, and wherein the BET SSA of the optional third carbonaceous particulate material is higher than the BET SSA of the second carbonaceous particulate material.

In certain embodiments, the negative electrode of these aspects comprises at least about 2 wt. %, for example, at least about 5 wt. %, or at least about 10 wt. %, and optionally up to about 40 wt. % metal-based nano-particulate active material, based on the total weight of the electrode. In certain embodiments, the negative electrode comprises from about 5 wt. % to about 35 wt. %, metal-based nano-particulate active material, based on the total weight of the electrode, for example, from about 5 wt. % to about 30 wt. %, or from about 5 wt. % to about 25 wt. %, or from about 10 wt. % to about 20 wt. %, or from about 10 wt. % to about 18 wt. %, or from about 12 wt. % to about 16 wt. %, or from about 13 wt. % to about 15 wt. %. In certain embodiments, the metal-based nano-particulate active material is elemental silicon, for example, elemental silicon having a purity of at least about 95%, or at least about 98%, optionally, less than about 99.99%, or less than about 99.9%, or less than about 99%. In such embodiments, the elemental silicon nano-particulate may have an average particle size of less than about 500 nm, for example, from about 10 nm to about 250 nm, or from about 20 nm to about 200 nm, or from about 20 nm to about 150 nm, or from about 20 nm to about 100 nm, or from about 20 nm to about 80 nm, or from about 20 nm to about 60 nm, or from about 30 nm to about 50 nm.

The negative electrode may be manufactured using conventional methods. In certain embodiments, the precursor composition is combined with a suitable binder. Suitable binder materials are many and various and include, for example, cellulose and acrylic based binder materials such as, for example, carboxymethyl cellulose and/or PAA (polyacrylic acid) binders. The amount of binder may vary. The amount of binder may be from about 1 wt. to about 20 wt. %, based on the total weight of the negative electrode, for example, from about 1 wt. % to about 15 wt. %, or from about 5 wt. % to about 10 wt. %.

The negative electrode may then be used in a Li-ion battery. In certain aspects, therefore, there is provided a Li-ion battery comprising a negative electrode having one or more of a discharge capacity at cycle 15 of at least about 400 mAh/g, or at least 500 mAh/g, based on the full electrode mass (including binder) and/or a discharge capacity loss between cycles 5 and 15 of equal to or less than about 25%, wherein the negative electrode comprises a metal-based nano-particulate active material and a carbonaceous particulate material. In certain embodiments, the negative electrode comprises at least two different carbonaceous particulate materials, optionally at least three different carbonaceous particulate materials. In certain embodiments, the negative electrode is formed from a precursor composition as defined herein, i.e., according to the first or second aspects and any embodiment thereof, e.g., Embodiment A, A1, B or C.

In certain embodiments, the negative electrode of the Li-ion battery has a discharge capacity at cycle 15 of at least about 500 mAh/g.

In certain embodiments, the negative electrode of the Li-ion battery has a discharge capacity at cycle 15 of at least about 520 mAh/g, for example, at least about 540 mAh/g, or at least about 560 mAh/g, or at least about 580 mAh/g, or at least about 600 mAh/g, or at least about 620 mAh/g, or at least about 640 mAh/g, or at least about 660 mAh/g. In certain embodiments, the negative electrode of the Li-ion battery has a discharge capacity at cycle 15 of no greater than about 3800 mAh/g, for example, no greater than about 3400 mAh/g, or no greater than about 3000 mAh/g, or no greater than about 2600 mAh/g, or no greater than about 2200 mAh/g, or no greater than about 1800 mAh/g, or no greater than about 1400 mAh/g, or no greater than about 1000 mAh/g.

Additionally or alternatively, the negative of the Li-ion battery has a discharge capacity loss between cycled 5 and 15 of equal to or less than about 20%, or equal to or less than about 18%, or equal to or less than about 16%, or equal to or less than about 14%, or equal to or less than about 12%, or equal to or less than about 10%.

Additionally, in certain embodiments, the negative electrode of the Li-ion battery has a $1^{st}$ cycle irreversible capacity of no greater than about 30%, for example, no greater than about 25%, or no greater than about 20%, or no greater than about 18%, or no greater than about 16%, or no greater than about 14%.

In certain embodiments, the negative electrode of the Li-ion battery is formed from a precursor composition according to Embodiment A, in which the carbon matrix consists of first, second and third carbonaceous particulate materials and has a BET SSA of less than about 7 m$^2$/g, for example, less than about 5.5 m$^2$/g, and comprises from about 10-20 wt. % elemental silicon nano-particulate active material, for example, 12-16 wt. %, has a discharge capacity of at least 660 mAh/g, a discharge capacity loss of equal to or less than about 14%, for example, equal to or less than about 10%, and optionally a $1^{s1}$ cycle irreversible capacity of no greater than about 20%, for example, no greater than about 16%. The first carbonaceous particulate is not a mixture and consists of a non-surface modified synthetic graphite. The combined amount of the second and third carbonaceous particulate is less from 10-20 wt. %, based on the total weight of the carbon matrix.

In certain embodiments, the negative electrode of the Li-ion battery is formed from a precursor composition according to Embodiment B, in which the carbon matrix consists of first, second and third carbonaceous particulate materials and has a BET SSA of less than about 7 m$^2$/g, for example, less than about 6.5 m$^2$/g, and comprises from about 10-20 wt. % elemental silicon nano-particulate active material, for example, 12-16 wt. %, has a discharge capacity of at least 600 mAh/g, a discharge capacity loss of equal to or less than about 14%, for example, equal to or less than about 12%, and optionally a $1^{st}$ cycle irreversible capacity of no greater than about 20%, for example, no greater than about 16%. The first carbonaceous particulate is not a mixture and consists of a non-surface modified synthetic graphite. The combined amount of the second and third carbonaceous particulate is from 8-12 wt. %, based on the total weight of the carbon matrix.

In certain embodiments, the negative electrode of the Li-ion battery is formed from a precursor composition according to Embodiment A1, in which the carbon matrix consists of first, second and third carbonaceous particulate materials and has a BET SSA of less than about 6 m$^2$/g, for example, less than about 5.0 m$^2$/g, and comprises from about 10-20 wt. % elemental silicon nano-particulate active material, for example, 12-16 wt. %, has a discharge capacity of at least 600 mAh/g, a discharge capacity loss of equal to or less than about 14%, and optionally a $1^{st}$ cycle irreversible capacity of no greater than about 16%, or no greater than about 14%. The first carbonaceous particulate is not a mixture and consists of a non-surface modified synthetic graphite. The combined amount of the second and third carbonaceous particulate is from 8-12 wt. %, based on the total weight of the carbon matrix.

In certain embodiments, the negative electrode of the Li-ion battery is formed from a precursor composition according to Embodiment B, in which the carbon matrix consists of first and second carbonaceous particulate materials and has a BET SSA of less than about 7 m$^2$/g, for example, less than about 6.0 m$^2$/g, and comprises from about 10-20 wt. % elemental silicon nano-particulate active material, for example, 12-16 wt. %, has a discharge capacity of at least 640 mAh/g, a discharge capacity loss of equal to or less than about 18%, and optionally a $1^{st}$ cycle irreversible capacity of no greater than about 30%. The first carbonaceous particulate is not a mixture and consists of a surface-modified synthetic graphite. The second carbonaceous particulate is present in an amount of less than about 10 wt. %, based on the total weight of the carbon matrix.

In certain embodiments, the negative electrode of the Li-ion battery is formed from a precursor composition according to Embodiment A, in which the carbon matrix consists of first, second and third carbonaceous particulate materials and has a BET SSA of less than about 6 m$^2$/g, for example, less than about 5.0 m$^2$/g, and comprises from about 10-20 wt. % elemental silicon nano-particulate active material, for example, 12-16 wt. %, has a discharge capacity of at least 620 mAh/g, a discharge capacity loss of equal to or less than about 14%, and optionally a $1^{st}$ cycle irreversible capacity of no greater than about 31%. The first carbonaceous particulate is a mixture and consists of a surface-modified synthetic graphite a non-surface modified synthetic graphite. The combined amount of the second and third carbonaceous particulate materials is less than about 10 wt. %, based on the total weight of the carbon matrix.

In certain embodiments, the negative electrode of the Li-ion battery is formed from a precursor composition according to Embodiment A, in which the carbon matrix consists of first, second and third carbonaceous particulate materials and has a BET SSA of less than about 7.0 m$^2$/g, for example, less than about 6.0 m$^2$/g, and comprises from about 10-20 wt. % elemental silicon nano-particulate active material, for example, 12-16 wt. %, has a discharge capacity of at least 600 mAh/g, a discharge capacity loss of equal to or less than about 13%, and optionally a $1^{st}$ cycle irreversible capacity of no greater than about 30%. The first carbonaceous particulate is not a mixture and consists of a surface-modified synthetic graphite. The combined amount of the second and third carbonaceous particulate is less than 10 wt. %, based on the total weight of the carbon matrix.

In certain embodiments, the negative electrode of the Li-ion battery is formed from a precursor composition according to Embodiment A, in which the carbon matrix consists of first, second and third carbonaceous particulate materials and has a BET SSA of less than about 7.0 m$^2$/g, for example, less than about 5.5 m$^2$/g, and comprises from about 10-20 wt. % elemental silicon nano-particulate active material, for example, 12-16 wt. %, has a discharge capacity of at least 540 mAh/g, a discharge capacity loss of equal to or less than about 20%, and optionally a $1^{st}$ cycle irreversible capacity of no greater than about 30%. The first carbonaceous particulate is not a mixture and consists of a surface-modified synthetic graphite. The combined amount of the second and third carbonaceous particulate is less than 7 wt. %, based on the total weight of the carbon matrix.

As described above, the Li-ion battery may be incorporated in a device requiring power. In certain embodiments, the device is an electric vehicle, for example, a hybrid electric vehicle or a plug-in electric vehicle.

In certain embodiments, the precursor composition is incorporated in an energy storage device. In other embodiments, the carbon matrix or precursor composition is incorporated in a carbon brush or friction pad.

In other embodiments, the precursor composition is incorporated within a polymer composite material, for example, in an amount ranging from about 5-95 wt. %, or 10-85%, based on the total weight of the polymer composite material.

Uses

In related aspects and embodiments, there is provided the use, as an additive in a negative electrode comprising a metal-based nano-particulate active material, of a mixture of a carbonaceous particulate material having a BET SSA of greater than about 20 m²/g (e.g., the third carbonaceous particulate as defined in Embodiment A or the second carbonaceous particulate as defined in Embodiment B) and a carbonaceous particulate having a BET SSA of equal to or lower than about 20 m²/g (e.g., the second carbonaceous particulate as defined in Embodiment A), the mixture having a spring-back of less than about 20%, for example, less than about 15%, or less than about 12%, optionally greater than about 5%, or equal to or greater than about 10%.

In certain embodiments, the additive is used for increasing discharge capacity and/or reducing discharge capacity loss and/or improving cycling stability of a Li-ion battery comprising the negative electrode, for example, compared to a Li-ion battery with a negative electrode comprising the metal-based nano-particulate active material which does not comprise the additive.

In certain embodiments, the negative electrode further comprises a carbonaceous particulate material having (i) a BET SSA of less than about 8 m²/g, for example, less than about 6 m²/g, or less than about 4 m²/g, and/or (ii) a spring-back of equal to or greater than about 20%, for example, equal to or greater than about 40%. In certain embodiments, the carbonaceous particulate material is the first carbonaceous particulate material as defined herein, and may be a surface-modified carbonaceous particulate or a non-surface-modified carbonaceous particulate, or mixture thereof, and having a spring-back of at least about 50%.

In another embodiments, there is provided the use of the second carbonaceous particulate material and/or the third carbonaceous particulate material as defined herein in a negative electrode for a Li-ion battery comprising a metal-based nano-particulate active material, for increasing discharge capacity and/or reducing discharge capacity loss and/or improving cycling stability of the Li-ion battery comprising the negative electrode, optionally wherein the negative electrode comprises at least about 1 wt. % of the active material, based on the total weight of the negative electrode, for example, compared to a Li-ion battery with a negative electrode comprising the active material which does not comprise the second carbonaceous particulate material and/or the third carbonaceous particulate material.

Also provided is the use of a carbonaceous particulate material having a BET SSA of greater than about 20 m²/g in a negative electrode for a Li-ion battery comprising a metal-based nano-particulate active material, optionally wherein the carbonaceous particulate material has a spring-back of equal to or less than about 20%. In certain embodiments, the use is for increasing discharge capacity and/or reducing discharge capacity loss and/or improving cycling stability of a Li-battery comprising the negative electrode, for example, compared to a Li-ion battery with a second negative electrode comprising the metal-based nano-particulate active material which does not comprise a carbonaceous particulate material having a BET SSA of greater than about 20 m²/g. In certain embodiments, the carbonaceous particulate material has a BET SSA of greater than about 30 m²/g and optionally a spring-back of equal to or less than about 15%. In certain embodiments, the carbonaceous particulate material is an exfoliated natural graphite. In certain embodiments, the carbonaceous particulate material is the second carbonaceous particulate material as defined in Embodiment B.

In certain embodiments, the carbonaceous particulate materials is part of a carbon matrix having a BET SSA of less than about 10 m²/g from which the negative electrode is manufactured, optionally wherein the carbon matrix comprises a first carbonaceous particulate material as defined herein, optionally further comprising another carbonaceous particulate material having a BET SSA of from about 8 m²/g to lower than 20 m²/g and/or a spring back of equal to or less than about 20%, for example, the second carbonaceous particulate as defined in Embodiment A.

In the foregoing embodiments, reference to discharge capacity may be discharge capacity at cycle 15. Likewise, any reference to discharge capacity loss may be discharge capacity loss between cycles 5 to 15.

Measurement Methods

BET Specific Surface Area (BET SSA)

The method is based on the registration of the absorption isotherm of liquid nitrogen in the range $p/p_o$=0.04-0.26, at 77 K. Following the procedure proposed by Brunauer, Emmet and Teller (Adsorption of Gases in Multimolecular Layers, *J. Am. Chem. Soc.,* 1938, 60, 309-319), the monolayer adsorption capacity can be determined. On the basis of the cross-sectional area of the nitrogen molecule, the monolayer capacity and the weight of the sample, the specific surface area can then be calculated.

Meso- and macro-porosity parameters, including average pore width and total volume of pores, are derivable from the nitrogen adsorption data using the Barrett-Joyner-Halenda (BJH) theory and microporosity in relation to the total BET surface area determined using the t-plot method. The average particle size of the silicon particulate may be calculated from the BET surface area assuming non-porous spherical particles and the theoretical density of silicon (2.33 g/cm³).

The average particle size of the silicon-carbon particulate composition may be calculated from the BET surface area assuming nonporous spherical particles and the theoretical density of the silicon-carbon particulate.

X-Ray Diffraction

XRD data were collected using a PANalytical X'Pert PRO diffractometer coupled with a PANalytical X'Celerator detector. The diffractometer has the following characteristics shown in Table 1:

TABLE 1

| Instrument data and measurement parameters | |
|---|---|
| Instrument | PANalytical X'Pert PRO |
| X-ray detector | PANalytical X'Celerator |
| X-ray source | Cu—$K_\alpha$ |
| Generator parameters | 45 kV-40 mA |
| Scan speed | 0.07°/s (for $L_c$ and c/2) |
| | 0.01°/s (for [004]/[110] ratio) |
| Divergence slit | 1° (for $L_c$ and c/2) |
| | 2° (for [004]/[110] ratio) |
| Sample spinning | 60 rpm |

The data were analyzed using the PANalytical X'Pert HighScore Plus software.

Interlayer Spacing c/2

The interlayer space c/2 is determined by X-ray diffractometry. The angular position of the peak maximum of the [002] reflection profiles are determined and, by applying the Bragg equation, the interlayer spacing is calculated (Klug and Alexander, X-ray Diffraction Procedures, John Wiley & Sons Inc., New York, London (1967)). To avoid problems due to the low absorption coefficient of carbon, the instrument alignment and non-planarity of the sample, an internal standard, silicon powder, is added to the sample and the graphite peak position is recalculated on the basis of the position of the silicon peak. The graphite sample is mixed with the silicon standard powder by adding a mixture of polyglycol and ethanol. The obtained slurry is subsequently applied on a glass plate by means of a blade with 150 µm spacing and dried.

Crystallite Size $L_c$

Crystallite size $L_c$ is determined by analysis of the [002] X-ray diffraction profiles and determining the widths of the peak profiles at the half maximum. The broadening of the peak should be affected by crystallite size as proposed by Scherrer (P. Scherrer, *Göttinger Nachrichten* 1918, 2, 98). However, the broadening is also affected by other factors such X-ray absorption, Lorentz polarization and the atomic scattering factor. Several methods have been proposed to take into account these effects by using an internal silicon standard and applying a correction function to the Scherrer equation. For the present disclosure, the method suggested by Iwashita (N. Iwashita, C. Rae Park, H. Fujimoto, M. Shiraishi and M. Inagaki, *Carbon* 2004, 42, 701-714) was used. The sample preparation was the same as for the c/2 determination described above.

Crystallite Size $L_a$

Crystallite size $L_a$ is calculated from Raman measurements using equation:

$$L_a\,[\text{Angstrom (Å)}]=C\times(I_G/I_D)$$

where constant C has values 44[A] and 58[A] for lasers with wavelength of 514.5 nm and 632.8 nm, respectively.

Xylene Density

The analysis is based on the principle of liquid exclusion as defined in DIN 51 901. Approx. 2.5 g (accuracy 0.1 mg) of powder is weighed in a 25 ml pycnometer. Xylene is added under vacuum (20 mbar). After a few hours dwell time under normal pressure, the pycnometer is conditioned and weighed. The density represents the ratio of mass and volume. The mass is given by the weight of the sample and the volume is calculated from the difference in weight of the xylene filled pycnometer with and without sample powder.
Reference: DIN 51 901

Scott Density (Apparent Density)

The Scott density is determined by passing the dry carbon powder through the Scott volumeter according to ASTM B 329-98 (2003). The powder is collected in a 1 in 3 vessel (corresponding to 16.39 cm³) and weighed to 0.1 mg accuracy. The ratio of weight and volume corresponds to the Scott density. It is necessary to measure three times and calculate the average value. The bulk density of graphite is calculated from the weight of a 250 mL sample in a calibrated glass cylinder.
Reference: ASTM B 329-98 (2003)

Spring-Back

Spring-back is a source of information regarding the resilience of compacted graphite powders. A defined amount of powder is poured into a die. After inserting the punch and sealing the die, air is evacuated from the die. A compression force of 0.5 tons/cm² is applied and the powder height is recorded. This height is recorded again after the pressure has been released. Spring-back is the height difference in percent relative to the height under pressure.

Particle Size Distribution by Laser Diffraction

The Particle Size Distribution of the carbonaceous particulates/carbon matrix is measured using a Sympatec HELOS BR Laser diffraction instrument equipped with RODOS/L dry dispersion unit and VIBRI/L dosing system. A small sample is placed on the dosing system and transported using 3 bars of compressed air through the light beam. The particle size distribution is calculated and reported in µm for the three quantiles: 10%, 50% and 90%.
References: ISO 13320-1

Lithium-Ion Negative Electrode Half Cell Test Standard Procedure

This test was used to quantify the specific charge of nano-Si/carbon-based electrodes.

General half-cell parameters: 2 electrode coin cell design with Li metal foil as counter/reference electrode, cell assembly in an argon filled glove box (oxygen and water content <1 ppm).

Diameter of electrodes: 13 mm.

A calibrated spring (100 N) was used in order to have a defined force on the electrode. Tests were carried out at 25° C.

Dispersion formulation: with 6% binder: 3.52 g (14%) nano-silicon (Si, 98+%, 30-50 nm, Nanostructured & Amorphous Materials Inc., USA), 20.11 g (80%) carbon matrix, 50.3 g (6%) CMC (Sodium-carboxymethylcellulose)/PAA (polyacrylic acid) solution (3% in water, 1:1 CMC/PAA w/w), 21 g ethanol; with 9% binder: 3.52 g (14%) nano-silicon (Si, 98+%, 30-50 nm, Nanostructured & Amorphous Materials Inc., USA), 19.36 g (77%) carbon matrix, 75.4 g (9%) CMC (Sodium-carboxymethylcellulose)/PAA (polyacrylic acid) solution (3% in water, 1:1 CMC/PAA w/w), 31 g ethanol.

Dispersion preparation: nano-silicon is dispersed in ethanol, sonicated for 5 min. This solution is added to the CMC/PAA binder solution, the carbon matrix is added, stirred with a glass rod, and then mixed with a rotor-stator mixer (13,000 rpm) for 5 min. Afterwards it is stirred with mechanical mixer at 1,000 rpm for 30 min under vacuum.

Electrode loading on copper electrode: 6 mg/cm².
Electrode density: 1.25 g/cm³.

Drying procedure: Coated Cu foils were dried for 1 h at 80° C., followed by 12 h at 150° C. under vacuum (<50 mbar). After cutting, the electrodes were dried for 10 h at 120° C. under vacuum (<50 mbar) before insertion into the glove box.

Electrolyte: Ethylenecarbonate (EC): Ethylmethylcarbonate (EMC) 1:3 (v/v), 1 M LiPF$_6$, 2% fluoroethylene carbonate, 0.5% vinylene carbonate.

Separator: Glass fiber sheet, ca. 1 mm.

Cycling program using a potentiostat/galvanostat: 1$^{st}$ charge: constant current step 20 mA/g to a potential of 5 mV vs. Li/Li$^+$, followed by a constant voltage step at 5 mV vs. Li/Li$^+$ until a cutoff current of 5 mA/g was reached. 1$^{st}$ discharge: constant current step 20 mA/g to a potential of 1.5 V vs. Li/Li$^+$, followed by a constant voltage step at 1.5 V vs. Li/Li$^+$ until a cutoff current of 5 mA/g was reached. Further charge cycles: constant current step at 186 mA/g to a potential of 5 mV vs. Li/Li$^+$, followed by a constant voltage step at 5 mV vs. Li/Li$^+$ until a cutoff current of 5 mA/g was reached. Further discharge cycles: constant current step at 1'116 mA/g to a potential of 1.5 V vs. Li/Li$^+$, followed by constant voltage step at 1.5 V vs. Li/Li$^+$ until a cutoff current of 5 mA/g was reached.

Numbered Embodiments

The present disclosure may be further illustrated by, but is not limited to, the following numbered embodiments:

1. Precursor composition for a negative electrode of a Li-ion battery comprising a metal-based nano-particulate active material, the precursor composition comprising metal-based nano-particulate active material, and a carbon matrix having a BET SSA of lower than about 10 m²/g, wherein the carbon matrix comprises at least first and second carbonaceous particulate materials, wherein the BET SSA of the first carbonaceous particulate material is lower than the BET SSA of the second carbonaceous particulate material and of the carbon matrix, wherein the BET SSA of the second carbonaceous particulate is higher than the BET SSA of the first carbonaceous particulate and of the carbon matrix.

2. Precursor composition according to embodiment 1, wherein the carbon matrix comprises a third carbonaceous particulate material, wherein the BET SSA of the third carbonaceous particulate material is higher than the BET SSA of the first carbonaceous particulate and of the carbon matrix.

3. Precursor composition according to embodiment 1 or 2, wherein
   (i) the second carbonaceous particulate material has a BET SSA higher than about 20 $m^2/g$, for example, higher than about 30 $m^2/g$; or
   (ii) the second or third carbonaceous particulate material has a BET SSA higher than about 20 $m^2/g$, for example, higher than about 30 $m^2/g$.

4. Precursor composition according to embodiment 1 or 2, wherein the second carbonaceous particulate material has a BET SSA higher than about 4 $m^2/g$ and lower than about 20 $m^2/g$, for example, higher than about 8 $m^2/g$ and lower than about 20 $m^2/g$, optionally wherein the third particulate material, when present, has a BET SSA higher than about 20 $m^2/g$.

5. Precursor composition for a negative electrode of a Li-ion battery comprising a metal-based nano-particulate active material, the precursor composition comprising a carbon matrix having a BET SSA of lower than about 10 $m^2/g$, wherein the carbon matrix comprises at least first, second and third carbonaceous particulate materials, wherein the BET SSA of the first carbonaceous particulate material is lower than the BET SSA of the second carbonaceous particulate material and of the carbon matrix, wherein the BET SSA of the second carbonaceous particulate material is higher than the BET SSA of the first carbonaceous particulate and of the carbon matrix, and wherein the BET SSA of the third carbonaceous particulate material is higher than the BET SSA of the second carbonaceous particulate material.

6. Precursor composition according to embodiment 5, further comprising a metal-based nano-particulate active material, for example, at least about 1 wt. % the active material, based on the total weight of the negative electrode.

7. Precursor composition according to any one of embodiments 1-6, wherein the first carbonaceous particulate material has a particle size distribution as follows:
   a $d_{90}$ of at least about 10 µm, for example, at least about 15 µm, or at least about 20 µm, or at least about 25 µm, or at least about 30 µm, optionally less than about 50 µm, or less than about 40 µm; and/or
   a $d_{50}$ of at least from about 5 µm to about 20 µm, for example, from about 10 µm to about 20 µm, or from about 10 µm to about 15 µm, or from about 15 µm to about 20 µm; and/or
   a $d_{10}$ of from about 2 µm to about 10 µm, for example, from about 3 µm to about 9 µm, or from about 3 µm to about 6 µm, or from about 5 µm to about 9 µm.

8. Precursor composition according to any one of embodiments 1-7, wherein:
   (i) each of the first and second carbonaceous particulate materials are graphitic; and/or
   (ii) each of the first and second carbonaceous particulate materials has a xylene density of at least about 2.1 $g/cm^3$; and/or
   (iii) at least the first carbonaceous particulate material, and optionally both of the first and second carbonaceous particulate materials, has a $d_{50}$ of less than 20 µm.

9. Precursor composition according to any one of embodiments 1-8, wherein the second carbonaceous particulate material has a BET SSA higher than about 8 $m^2/g$ and lower than about 20 $m^2/g$, for example, lower than about 12 $m^2/g$, and/or the third carbonaceous particulate material, when present, has a BET SSA higher than about 20 $m^2/g$, for example, higher than about 30 $m^2/g$.

10. Precursor composition according to any one of embodiments 1-9, wherein the first carbonaceous particulate material has a spring-back of at least 20%, the second carbonaceous particulate material has a spring-back of less than 20%, and, when present, the third particulate has a spring-back of less than 20%.

11. Precursor composition according to any one of embodiments 1-10, wherein each of the first, second and, when present, third carbonaceous particulate materials are graphite, for example, natural or synthetic graphite.

12. Precursor composition according to embodiment 11, wherein the first carbonaceous particulate material is a synthetic graphite.

13. Precursor composition according to embodiment 11 or 12, wherein the graphite is surface-modified.

14. Precursor composition according to embodiment 11 or 12, wherein the graphite is not-surface modified.

15. Precursor composition according to any one of embodiments 1-14, wherein the second and/or, when present, third carbonaceous particulate is a synthetic graphite, for example, a graphitized petroleum based coke, or a natural graphite, for example, a chemically and/or thermally purified natural flake graphite, or an exfoliated natural graphite, or an exfoliated synthetic graphite.

16. Precursor composition according to any one of embodiments 1-15, wherein the first carbonaceous material is a mixture of carbonaceous particulate materials each individually having a BET SSA which is less than the BET SSA of the carbon matrix.

17. Precursor composition according to any one of embodiments 1-16, wherein the carbon matrix has a BET SSA of lower than about 6.0 $m^2/g$, for example, equal to or lower than about than about 5.0 $m^2/g$.

18. Precursor composition according to any one of embodiments 1-17, wherein the first carbonaceous particulate material constitutes up to about 99 wt. % of the carbon matrix, for example, up to about 95 wt. %, and the second and, when present, third carbonaceous materials, constitute up to about 40 wt. % of the carbon matrix, for example, from about 5 wt. % to about 20 wt. %.

19. Precursor composition according to any one of embodiments 1-18, wherein the carbon matrix further comprises conductive carbon black, for example, up to about 10 wt. % conductive carbon black.

20. Precursor composition according to any one of embodiments 1-19, wherein the metal-based nano-particulate active material is elemental silicon.

21. Negative electrode for a Li-ion battery comprising a metal-based nano-particulate active material, manufactured from a precursor composition according to any one of embodiments 1-20.

22. Negative electrode comprising a metal-based nano-particulate active material, for example, at least 1 wt. % of said active material based on the total weight of the electrode, and a carbon matrix having a BET SSA of lower than about 10 $m^2/g$, wherein the carbon matrix comprises at least first, second and optional third carbonaceous particulate materials, wherein the BET SSA of the first carbonaceous particulate material is lower than the BET SSA of the second carbonaceous particulate material and of the carbon matrix, wherein the BET SSA of the second carbonaceous particulate material is higher than the BET SSA of the first carbonaceous particulate and of the carbon matrix, and wherein the BET SSA of the optional third carbonaceous particulate material is higher than the BET SSA of the second carbonaceous particulate material.

23. Negative electrode according to embodiment 21 or 22, comprising at least about 2 wt. %, for example, at least about 5 wt. %, or at least about 10 wt. %, and optionally up to about 90 wt. % metal-based nano-particulate active material, based on the total weight of the electrode, for example, up to about 40 wt. %.

24. Li-ion battery comprising a negative electrode according to any one of embodiments 21-23.

25. Li-ion battery comprising a negative electrode, the Li-ion battery having one or more of:
a discharge capacity at cycle 15 of at least about 400 mAh/g, or at least about 500 mAh/g; and/or
a discharge capacity loss between cycles 5 and 15 of equal to or less than about 25%, based on the full mass of the negative electrode,
wherein the negative electrode comprises a metal-based nano-particulate active material and a carbonaceous particulate, optionally wherein the metal-based nano-particulate active material is elemental silicon.

26. Li-ion battery according to embodiment 25, wherein the negative electrode comprises at least two different carbonaceous particulate materials, optionally at least three different carbonaceous materials.

27. Li-ion battery according to any one of embodiments 24-26, wherein the negative electrode has a discharge capacity at cycle 15 of at least about 600 mAh/g and/or a discharge capacity loss between cycles 5 and 15 of equal to or less than about 15%.

28. Li-ion battery according to embodiment 27, wherein the negative electrode has a discharge capacity at cycle 15 of at least about 660 mAh/g and/or a discharge capacity loss between cycles 5 and 15 of equal to or less than about 10%.

29. Li-ion battery according to any one of embodiments 25-28, wherein the negative electrode comprises or is manufactured from a precursor composition according to any one of embodiments 1-20.

30. A device comprising a Li-ion battery according to any one of embodiments 24-29.

31. Use, as an additive in a negative electrode comprising a metal-based nano-particulate active material, of a mixture of a carbonaceous particulate material having a BET SSA of greater than about 20 $m^2/g$ and a carbonaceous particulate having a BET SSA of equal to or lower than about 20 $m^2/g$, the mixture having a spring-back of less than about 20%.

32. Use according to embodiment 31 for increasing discharge capacity and/or reducing discharge capacity loss and/or improving cycling stability of a Li-ion battery comprising the negative electrode, for example, compared to a Li-ion battery with a second negative electrode comprising the metal-based nano-particulate active material which does not comprise the additive.

33. Use according to embodiments 31 or 32, wherein the negative electrode further comprises a carbonaceous particulate material having (i) a BET SSA of less than about 8 $m^2/g$, for example, less than about 6 $m^2/g$, or less than about 4 $m^2/g$, and/or (ii) a spring-back of equal to or greater than about 20%, for example, equal to or greater than about 40%.

34. Use of the second carbonaceous particulate material and/or the third carbonaceous particulate material as defined in any one of embodiments 1-20 in a negative electrode for a Li-ion battery comprising a metal-based nano-particulate active material, for increasing discharge capacity and/or reducing discharge capacity loss and/or improving cycling stability of the Li-ion battery comprising the negative electrode, wherein the negative electrode comprises at least about 1 wt. % of the metal-based nano-particulate active material, based on the total weight of the negative electrode, for example, compared to a Li-ion battery with a second negative electrode comprising the metal-based nano-particulate active material which does not comprise the additive.

35. Use of a carbonaceous particulate material having a BET SSA of greater than about 20 $m^2/g$ in a negative electrode for a Li-ion battery comprising a metal-based nano-particulate active material, optionally wherein the carbonaceous particulate material has a spring-back of equal to or less than about 20%.

36. Use according to embodiment 35 for increasing discharge capacity and/or reducing discharge capacity loss and/or improving cycling stability of a Li-battery comprising the negative electrode, for example, compared to a Li-ion battery with a second negative electrode comprising the metal-based nano-particulate active material which does not comprise carbonaceous particulate material having a BET SSA of greater than about 20 $m^2/g$.

37. Use according to embodiment 35 or 36, wherein the carbonaceous particulate material has a BET SSA of greater than about 30 $m^2/g$ and optionally a spring-back of equal to or less than about 15%.

38. Use according to any one of embodiments 35-37, wherein the carbonaceous particulate material is an exfoliated natural graphite or an exfoliated synthetic graphite.

39. Use according to any one of embodiments 35-38, wherein the carbonaceous particulate material is part of a carbon matrix having a bulk BET SSA of less than about 10 $m^2/g$ from which the negative electrode is manufactured, optionally wherein the carbon matrix comprises a first carbonaceous particulate material as defined in any one of embodiments 1-20, optionally further comprising another carbonaceous particulate material having a BET SSA of from about 8 $m^2/g$ to lower than 20 $m^2/g$ and/or a spring back of equal to or less than about 20%

40. Use according to any one of embodiments 31-39, wherein the metal-based nano-particulate active material is elemental silicon.

41. A device comprising an electrode according to any one of embodiments 21-23 or a Li-ion battery according to any one of embodiments 24-29.

42. A device according to embodiment 41, wherein the device is an electric vehicle, a hybrid electric vehicle, or a plug-in hybrid electric vehicle.

43. An energy storage cell comprising a precursor composition according to any one of embodiments 1-20.

Having described the various aspects of the present disclosure in general terms, it will be apparent to those of skill in the art that many modifications and slight variations are possible without departing from the spirit and scope of the present disclosure. The present disclosure is furthermore described by reference to the following, non-limiting working examples.

EXAMPLES

Several types of carbonaceous particulate materials were mixed to from a number of carbon matrices for negative electrodes comprising 14 wt. % of a silicon active material (diameter: 30-50 nm) and 6 wt. % or 9 wt. % of CMC (carboxymethyl cellulose)/PAA (polyacrylic acid) binder. The carbonaceous particulates are summarized in Table 1.

TABLE 1

| | BET Specific Surface Area [m²/g] | X-Ray Diffraction c/2 [nm] | X-Ray Diffraction $L_c$ [nm] | Xylene Density [g/cm³] | Scott Density [g/cm³] | Springback [%] | Particle Size Distribution d90/d50/d10 [μm] |
|---|---|---|---|---|---|---|---|
| 1 | 2.8 | 0.336 | 128 | 2.24 | 0.37 | 50 | 28.7/12.7/4.7 |
| 2 | 3.7 | 0.3357 | 157 | 2.23 | 0.46 | 64 | 34.8/17.1/7.2 |
| 3 | 9.3 | 0.3357 | 177 | 2.25 | 0.08 | 10 | 15.9/7.8/3.3 |
| 4 | 31.7 | 0.3361 | 27 | 2.25 | 0.05 | 12 | 9.9/4.8/1.9 |
| 5 | 45 | 0.3585 | 2 | 2.13 | 0.04 | not measured | not measured |

Each electrode was tested for electrochemical performance in accordance with the methods described above. Electrode compositions and electrochemical data are summarized in Table 2 below. Discharge capacities are expressed based on the full electrode mass, including binder.

TABLE 2

| | Carbon Matrix Composition | | | | | | BET SSA of the C-matrix [m²/g] | Electrochemical Data | | | |
|---|---|---|---|---|---|---|---|---|---|---|---|
| | Graphite 1 [%] | Graphite 2 [%] | Graphite 3 [%] | Graphite 4 [%] | Conductive Carbon Black 5 [%] | Binder Content [%] | | Discharge Capacity Cycle 5 [mAh/g] | Discharge Capacity Cycle 15 [mAh/g] | Discharge Capacity Loss Cycle 5-15 [%] | 1st cycle Irreversible capacity loss (%) |
| A | 100 | 0 | 0 | 0 | 0 | 6 | 2.8 | 657 | 481 | 27 | 14 |
| B | 86 | 0 | 7 | 7 | 0 | 6 | 5.5 | 740 | 665 | 10 | 16 |
| C | 90 | 0 | 0 | 7 | 3 | 6 | 6.3 | 702 | 615 | 12 | 16 |
| D | 90 | 0 | 7 | 0 | 3 | 6 | 4.7 | 721 | 619 | 14 | 14 |
| E | 0 | 100 | 0 | 0 | 0 | 9 | 3.7 | 716 | 524 | 27 | 20 |
| F | 0 | 93 | 0 | 7 | 0 | 9 | 5.5 | 792 | 646 | 18 | 30 |
| G | 35 | 58 | 3 | 4 | 0 | 9 | 4.5 | 721 | 622 | 14 | 31 |
| H | 0 | 93 | 3 | 4 | 0 | 9 | 5.7 | 711 | 618 | 13 | 30 |
| I | 0 | 95 | 3 | 2 | 0 | 9 | 5.0 | 694 | 558 | 20 | 30 |

The invention claimed is:

1. A precursor composition for a negative electrode of a Li-ion battery comprising a metal-based nano-particulate active material, the precursor composition comprising
   (i) a metal-based nano-particulate active material, and
   (ii) a carbon matrix having a BET SSA of lower than about 10 m²/g, wherein the carbon matrix comprises at least first and second carbonaceous particulate materials,
   wherein the BET SSA of the first carbonaceous particulate material is lower than the BET SSA of the second carbonaceous particulate material and of the carbon matrix, wherein the second carbonaceous particulate material has a BET SSA higher than about 20 m²/g, and
   wherein the BET SSA of the second carbonaceous particulate material is higher than the BET SSA of the first carbonaceous particulate material and of the carbon matrix.

2. A precursor composition according to claim 1, wherein the carbon matrix comprises a third carbonaceous particulate material having a BET SSA higher than about 20 m²/g.

3. A precursor composition according to claim 2, wherein the third carbonaceous particulate material has a BET SSA higher than about 30 m²/g.

4. A precursor composition according to claim 1, wherein the first carbonaceous particulate material has a particle size distribution as follows :
   (i) a $d_{90}$ of at least about 10 μm; and/or
   (ii) a $d_{50}$ of at least from about 5 μm to about 20 μm; and/or
   (iii) a $d_{10}$ of from about 2 μm to about 10 μm.

5. A precursor composition according to claim 1, wherein:

(i) each of the first and second carbonaceous particulate materials is graphitic; and/or (ii) each of the first and second carbonaceous particulate materials has a xylene density of at least about 2.1 g/cm³; and/or (iii) at least the first carbonaceous particulate material has a $d_{50}$ of less than 20 μm; and/or (iv) the first carbonaceous particulate material has a spring-back of at least 20% and the second carbonaceous particulate material has a spring-back of less than 20%.

6. A precursor composition according to claim 1, wherein each of the first and second carbonaceous particulate materials is natural or synthetic graphite.

7. A precursor composition according to claim 6, wherein the graphite is a graphitized petroleum based coke, a chemically and/or thermally purified natural flake graphite, an exfoliated natural graphite, or an exfoliated synthetic graphite.

8. A precursor composition according to claim 1 wherein the first carbonaceous particulate material constitutes up to about 99 wt. % of the carbon matrix.

9. A precursor composition according to claim 1, wherein the metal-based nanoparticulate active material is elemental silicon.

10. A precursor composition according to claim 1, wherein the second carbonaceous particulate material has a BET SSA higher than about 30 $m^2/g$.

11. A negative electrode for a Li-ion battery, comprising the precursor composition according to claim 1 wherein the negative electrode comprises at least about 2 wt. % of the metal-based nano-particulate active material, based on the total weight of the electrode.

12. A Li-ion battery comprising a negative electrode according to claim 11;
a discharge capacity at cycle 15 of at least about 400 mAh/g; and/or
a discharge capacity loss between cycles 5 and 15 of equal to or less than about 25% based on the full mass of the negative electrode.

13. A device comprising an electrode according to claim 11, wherein the device is an electric vehicle, a hybrid electric vehicle, or a plug-in hybrid electric vehicle.

14. A precursor composition for a negative electrode of a Li-ion battery comprising a metal-based nano-particulate active material, the precursor composition comprising a carbon matrix having a BET SSA of lower than about 10 $m^2/g$,
wherein the carbon matrix comprises at least first, second and third carbonaceous particulate materials,
wherein the BET SSA of the first carbonaceous particulate material is lower than the BET SSA of the second carbonaceous particulate material and of the carbon matrix, wherein the second carbonaceous particulate material has a BET SSA higher than about 20 $m^2/g$,
wherein the BET SSA of the second carbonaceous particulate material is higher than the BET SSA of the first carbonaceous particulate material and of the carbon matrix, and
wherein the BET SSA of the third carbonaceous particulate material is higher than the BET SSA of the second carbonaceous particulate material.

15. A precursor composition according to claim 14, further comprising a metal-based nano-particulate active material.

16. A precursor composition according to claim 15, wherein the precursor compositions comprise at least about 1 wt. % of the active material, based on the total weight of the negative electrode.

17. A precursor composition according to claim 14, wherein the second carbonaceous particulate material has a BET SSA higher than about 30 $m^2/g$.

* * * * *